US012257829B2

(12) United States Patent
Yamamoto et al.

(10) Patent No.: US 12,257,829 B2
(45) Date of Patent: Mar. 25, 2025

(54) RECORDING APPARATUS AND RECORDING METHOD

(71) Applicant: SEIKO EPSON CORPORATION, Tokyo (JP)

(72) Inventors: Yoshiaki Yamamoto, Nagano (JP); Eiichi Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 18/046,947

(22) Filed: Oct. 17, 2022

(65) Prior Publication Data

US 2023/0121998 A1 Apr. 20, 2023

(30) Foreign Application Priority Data

Oct. 18, 2021 (JP) ................................ 2021-170105

(51) Int. Cl.
*B41J 2/045* (2006.01)
*B41J 2/21* (2006.01)

(52) U.S. Cl.
CPC ....... *B41J 2/04505* (2013.01); *B41J 2/04581* (2013.01)

(58) Field of Classification Search
CPC ...................................................... B41J 2/2139
See application file for complete search history.

(56) References Cited

U.S. PATENT DOCUMENTS

2007/0076039 A1* 4/2007 Batalla .................. B41J 29/393 347/19
2007/0139460 A1* 6/2007 Araki ..................... B41J 2/2142 347/19
2009/0219371 A1* 9/2009 Terada .................. B41J 13/103 271/233
2012/0154477 A1* 6/2012 Yamazaki ............. B41J 2/2146 347/19
2016/0059599 A1 3/2016 Kyoso
2018/0201015 A1* 7/2018 Hochi ....................... B41J 2/13

FOREIGN PATENT DOCUMENTS

JP 2016-049631 A 4/2016
JP 2016-221835 A 12/2016

* cited by examiner

*Primary Examiner* — Shelby L Fidler
(74) *Attorney, Agent, or Firm* — Global IP Counselors, LLP

(57) ABSTRACT

A recording apparatus includes a liquid ejection unit that moves in a first direction relative to a medium and eject liquid, and a control unit that controls the liquid ejection unit. The liquid ejection unit includes a plurality of nozzles arranged in a direction different from the first direction and configured to eject the liquid, the control unit forms, by using a first nozzle of the nozzles, a first pattern with a first length in the first direction, the control unit forms, by using two or more nozzles different from the first nozzle, a second pattern including an image arrangement in which images are arranged so as to be displaced in a step-like manner in the first direction and a second direction different from the first direction, a region on the medium where the second pattern is formed has a second length in the first direction, and the first length is greater than the second length.

8 Claims, 11 Drawing Sheets

RECORDING APPARATUS AND RECORDING METHOD

The present application is based on, and claims priority from JP Application Serial Number 2021-170105, filed Oct. 18, 2021, the disclosure of which is hereby incorporated by reference herein in its entirety.

BACKGROUND

1. Technical Field

The present disclosure relates to a recording apparatus and a recording method.

2. Related Art

An ink-jet printer that examines abnormalities of a recording element is known. The ink-jet printer of JP-A-2016-49631 prints a test chart for inspection. The ink-jet printer reads the printed test chart with a scanner. The ink-jet printer examines abnormalities of the recording element on the basis of the reading result read with the scanner. The test chart used in JP-A-2016-49631 is a nozzle check pattern in which a plurality of lines are formed in a step-like manner.

In the ink-jet type recording apparatus, print blur and line waviness may be generated in nozzle check patterns due to a vibration applied to the ink-jet head and the like.

SUMMARY

A recording apparatus of the present disclosure includes a liquid ejection unit configured to move in a first direction relative to a medium and eject liquid, and a control unit configured to control the liquid ejection unit. The liquid ejection unit includes a plurality of nozzles arranged in a direction different from the first direction and configured to eject the liquid, the control unit forms, by using a first nozzle of the plurality of nozzles, a first pattern with a first length in the first direction, the control unit forms, by using two or more nozzles different from the first nozzle, a second pattern including an image arrangement in which images are arranged so as to be displaced in a step-like manner in the first direction and a second direction different from the first direction, a region, on the medium, where the second pattern is formed has a second length in the first direction, and the first length is greater than the second length.

A recording method of the present disclosure includes moving a medium in a first direction relative to a liquid ejection unit including a plurality of nozzles, forming a first pattern having a first length in the first direction by using a first nozzle of the plurality of nozzles, and forming a second pattern by using two or more nozzles different from the first nozzle among the plurality of nozzles, the second pattern including an image arrangement in which images are arranged so as to be displaced in a step-like manner in the first direction and a second direction intersecting the first direction, a region, on the medium, where the second pattern is formed has a second length in the first direction, and the first length is greater than the second length.

DESCRIPTION OF EXEMPLARY EMBODIMENTS

Figure 1:
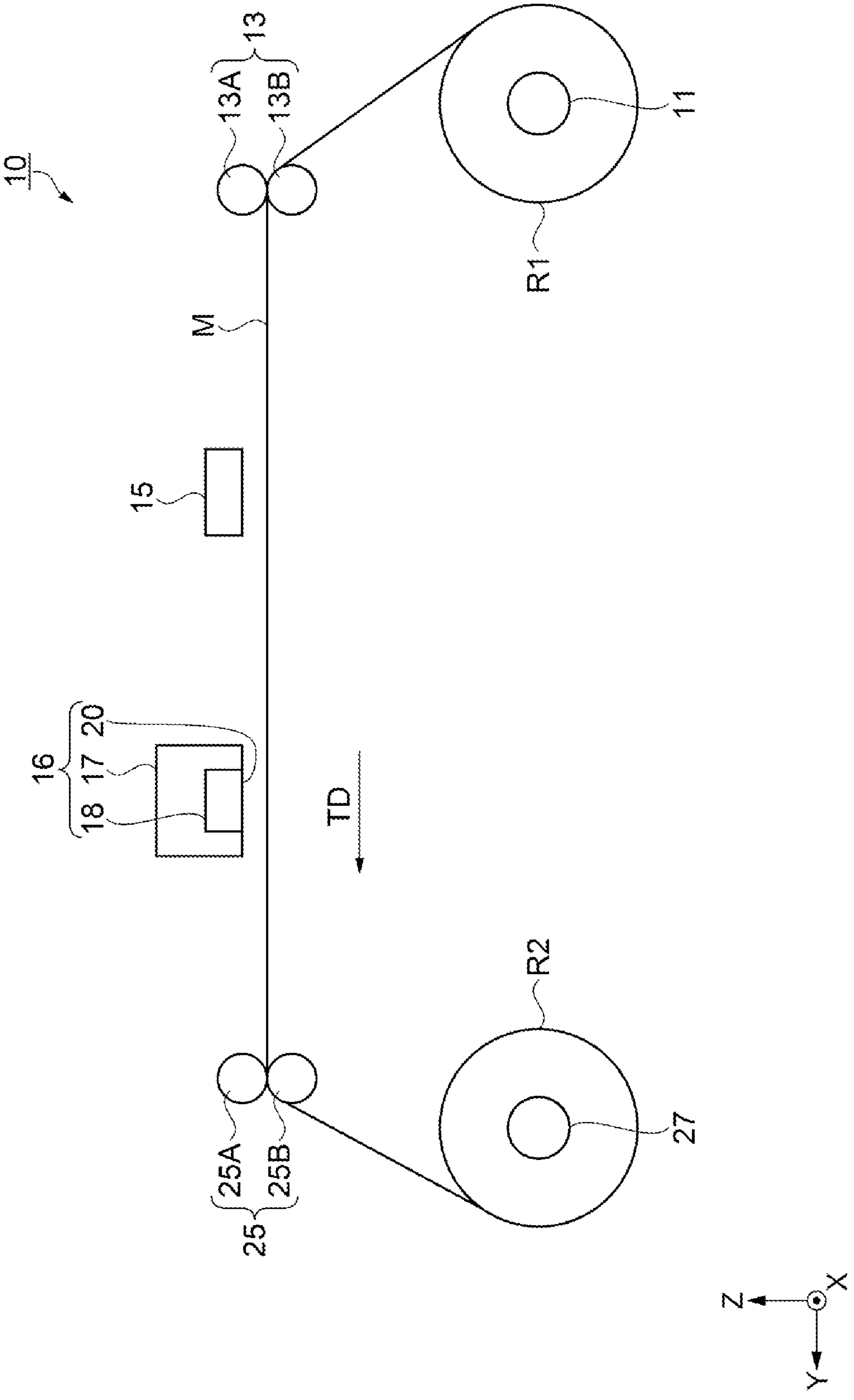
FIG. 1 is a diagram illustrating a schematic configuration of a printing apparatus.
Figure 2:
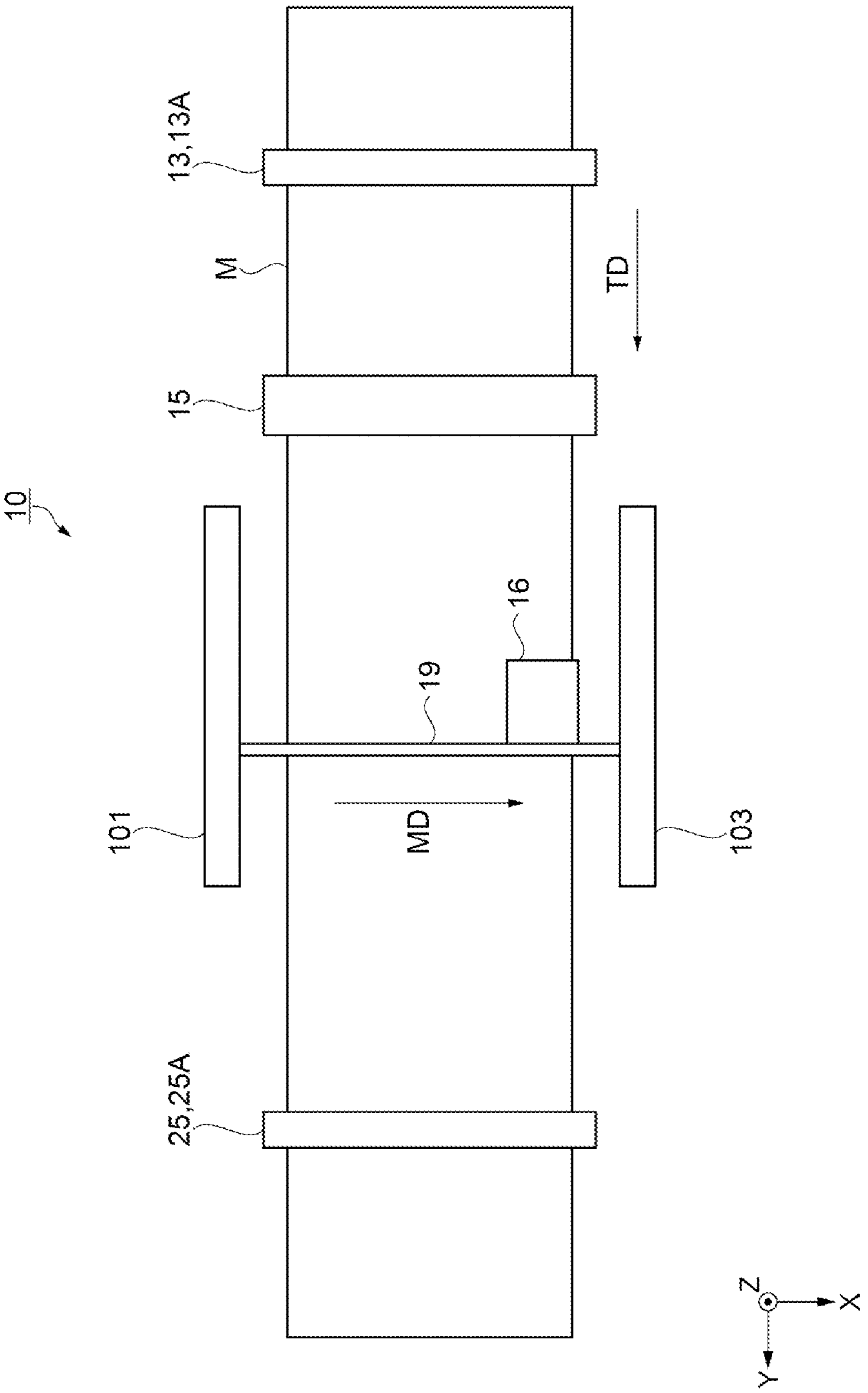
FIG. 2 is a diagram illustrating a schematic configuration of a printing apparatus.

FIG. 1 and FIG. 2 are diagrams illustrating a schematic configuration of a printing apparatus 10. FIG. 1 is a diagram illustrating the printing apparatus 10 as viewed from the +X direction. FIG. 2 is a diagram illustrating the printing apparatus 10 as viewed from the +Z direction. The printing apparatus 10 performs printing on a printing medium M fed from a medium roll R1. The printing apparatus 10 corresponds to an example of a recording apparatus. The printing medium M corresponds to an example of a medium.

Some diagrams including FIG. 1 illustrate an XYZ coordinate system. The X axis, the Y axis, and the Z axis are orthogonal to each other. The X axis is parallel to the installation surface of the printing apparatus 10. The X axis is an axis that is parallel to the rotation axis of a medium roll R1 placed in the printing apparatus 10. The rotation axis is a virtual rotation central axis when the medium roll R1 rotates. The direction from the far side toward the near side in FIG. 1 is the +X direction. The direction from the near side toward the far side in FIG. 1 is the −X direction. The Y axis is parallel to the installation surface of the printing apparatus 10. The Y axis is an axis orthogonal to the rotation axis. The direction from right to left of the printing apparatus 10 illustrated in FIG. 1 is the +Y direction. The direction from left to right of the printing apparatus 10 illustrated in FIG. 1 is the −Y direction. The Z axis is an axis perpendicular to the installation surface of the printing apparatus 10. The upward direction from the installation surface is the +Z direction. The direction toward the installation surface from above is the −Z direction.

FIG. 1 and FIG. 2 illustrate units disposed along the printing medium M. The printing apparatus 10 illustrated in FIG. 1 and FIG. 2 includes a feed shaft 11, a feed roller pair 13, a reading sensor 15, a printing mechanism 16, a conveyance roller pair 25, and a winding shaft 27.

The feed shaft 11 supports the medium roll R1 composed of the printing medium M wound in a roll form. The feed shaft 11 is supported in a rotatable manner. The feed shaft 11 may be connected to a rotation driving mechanism not illustrated in the drawing. The rotation driving mechanism rotates the feed shaft 11. The rotated feed shaft 11 feeds the printing medium M wound around the medium roll R1.

The feed roller pair 13 feeds the printing medium M toward the printing mechanism 16. The direction in which the printing medium M is conveyed at the position facing the printing mechanism 16 is hereinafter referred to as conveyance direction TD. The feed roller pair 13 sandwiches the printing medium M. The feed roller pair 13 includes a first feed roller 13A and a second feed roller 13B. The first feed roller 13A is disposed at a position on the +Z direction side of the second feed roller 13B. The first feed roller 13A makes contact with the +Z direction side surface of the printing medium M. The second feed roller 13B makes contact with the −Z direction side surface of the printing medium M. The first feed roller 13A and the second feed roller 13B sandwich the printing medium M. One of the first feed roller 13A and the second feed roller 13B is connected to a driving mechanism not illustrated in the drawing. One of the first feed roller 13A and the second feed roller 13B is rotated by the driving force of the driving mechanism. The other of the first feed roller 13A and the second feed roller 13B is rotated to follow. With the driving force of the driving mechanism, the feed roller pair 13 feeds the printing medium M toward the printing mechanism 16. The feed roller pair 13 conveys the printing medium M in the direction opposite to the conveyance direction TD.

The reading sensor 15 reads the surface of the printing medium M. The reading sensor 15 is composed of an image sensor such as a charge coupled device (CCD). The reading sensor 15 illustrated in FIG. 1 reads the entire width parallel to the X axis of the printing medium M. In the printing apparatus 10 illustrated in FIG. 1 and FIG. 2, the reading sensor 15 reads the printing medium M located between the feed roller pair 13 and the printing mechanism 16. The printing apparatus 10 illustrated in FIG. 1 and FIG. 2 conveys the printing medium M in the direction opposite to the conveyance direction TD. The reading sensor 15 reads the printing medium M conveyed in the direction opposite to the conveyance direction TD. The reading sensor 15 reads an image printed by the printing mechanism 16 on the printing medium M. The position of the reading sensor 15 is not limited to the position between the feed roller pair 13 and the printing mechanism 16. The reading sensor 15 may be disposed at a position between the printing mechanism 16 and the conveyance roller pair 25 on the conveyance path of the printing medium M. The reading sensor 15 corresponds to an example of a detection unit.

The printing mechanism 16 prints images on the printing medium M. The printing mechanism 16 is of an ink-jet type. The printing mechanism 16 forms images by ejecting ink to the printing medium M. The printing mechanism 16 includes a carriage 17 and a printing head 18 as illustrated in FIG. 1. The printing head 18 includes a plurality of ink nozzles 20. The printing mechanism 16 is supported by a carriage support shaft 19 illustrated in FIG. 2. The printing mechanism 16 illustrated in FIG. 1 and FIG. 2 moves the carriage 17, but this is not limitative. The printing mechanism 16 may be of a line head type that fixes the printing head 18 with respect to the printing medium M at the time of printing. The printing mechanism 16 corresponds to an example of a liquid ejection unit. The ink corresponds to an example of liquid.

The carriage 17 supports the printing head 18. The carriage 17 moves in a movement direction MD along the carriage support shaft 19 illustrated in FIG. 2. When the carriage 17 moves, the printing mechanism 16 moves with respect to the printing medium M. The carriage support shaft 19 illustrated in FIG. 2 is parallel to or approximately parallel to the X axis. The carriage 17 moves in the +X direction and the −X direction with respect to the printing medium M. When the carriage 17 moves, the printing mechanism 16 causes the ink nozzle 20 to perform scanning with respect to the printing medium M. As illustrated in FIG. 2, the +X direction is the movement direction MD, and corresponds to an example of a first direction. The movement direction MD may be the −X direction. The carriage 17 is moved by the driving force of the carriage driving mechanism not illustrated in the drawing. The carriage 17 corresponds to an example of an ejection unit driving mechanism. In the printing apparatus 10 illustrated in FIG. 1 and FIG. 2, the printing mechanism 16 moves with respect to the printing medium M, but this is not limitative. The printing medium M may move in the +X direction and the −X direction with respect to the printing mechanism 16. The printing mechanism 16 moves relative to the printing medium M.

The printing head 18 is supported by the carriage 17. The printing head 18 includes the plurality of ink nozzles 20 at a surface that faces the printing medium M. The ink nozzle 20 can eject the ink to the printing medium M. The ink nozzle 20 corresponds to an example of a nozzle. The configuration of the ink nozzle 20 will be described later. Ink of a plurality of colors is supplied to the printing head 18 from an ink tank or an ink cartridge not illustrated in the drawing.

The carriage support shaft 19 supports the carriage 17 in a movable manner. As illustrated in FIG. 2, the carriage support shaft 19 is supported by a first side plate 101 and a second side plate 103. The first side plate 101 is disposed at a position on the −X direction side of the printing medium M that is being conveyed. The second side plate 103 is disposed at a position on the +X direction side of the printing medium M that is being conveyed. The carriage support shaft 19 is supported along the axis intersecting the Y axis. The carriage support shaft 19 illustrated in FIG. 2 is supported in parallel to or approximately parallel to the X axis. The first side plate 101 and the second side plate 103 may support the feed roller pair 13, the reading sensor 15, and the conveyance roller pair 25.

The conveyance roller pair 25 conveys the printing medium M printed by the printing mechanism 16. The conveyance roller pair 25 sandwiches the printing medium M. The conveyance roller pair 25 includes a first conveyance roller 25A and a second conveyance roller 25B. The first conveyance roller 25A is disposed at a position on the +Z direction side of the second conveyance roller 25B. The first conveyance roller 25A makes contact with the +Z direction side surface of the printing medium M. The second conveyance roller 25B makes contact with the −Z direction side surface of the printing medium M. The first conveyance roller 25A and the second conveyance roller 25B sandwich the printing medium M. One of the first conveyance roller 25A and the second conveyance roller 25B may be connected to a driving mechanism not illustrated in the drawing. One of the first conveyance roller 25A and the second conveyance roller 25B is rotated by the driving force of the driving mechanism when connected to the driving mechanism. The other of the first conveyance roller 25A and the second conveyance roller 25B is rotated to follow. The conveyance roller pair 25 guides the printing medium M to a winding roll R2. The conveyance roller pair 25 may convey the printing medium M in the direction opposite to the conveyance direction TD.

The winding shaft 27 winds, around the winding roll R2, the printing medium M printed by the printing mechanism 16. The winding shaft 27 supports the winding roll R2. The winding shaft 27 is supported in a rotatable manner. The winding shaft 27 may be connected to a rotation driving mechanism not illustrated in the drawing. The rotation driving mechanism rotates the winding shaft 27. The rotated winding shaft 27 winds the printing medium M around the winding roll R2. The winding shaft 27 may wind the printing medium M through a roll core not illustrated in the drawing.

The printing apparatus 10 illustrated in FIG. 1 and FIG. 2 uses the printing medium M wound around the medium roll R1, but this is not limitative. The printing apparatus 10 may use a cut sheet cut into a predetermined size. In the case where the printing apparatus 10 uses the cut sheet, the feed shaft 11 and the winding shaft 27 are changed to a sheet feeding cassette and a paper tray, respectively.

Figure 3:
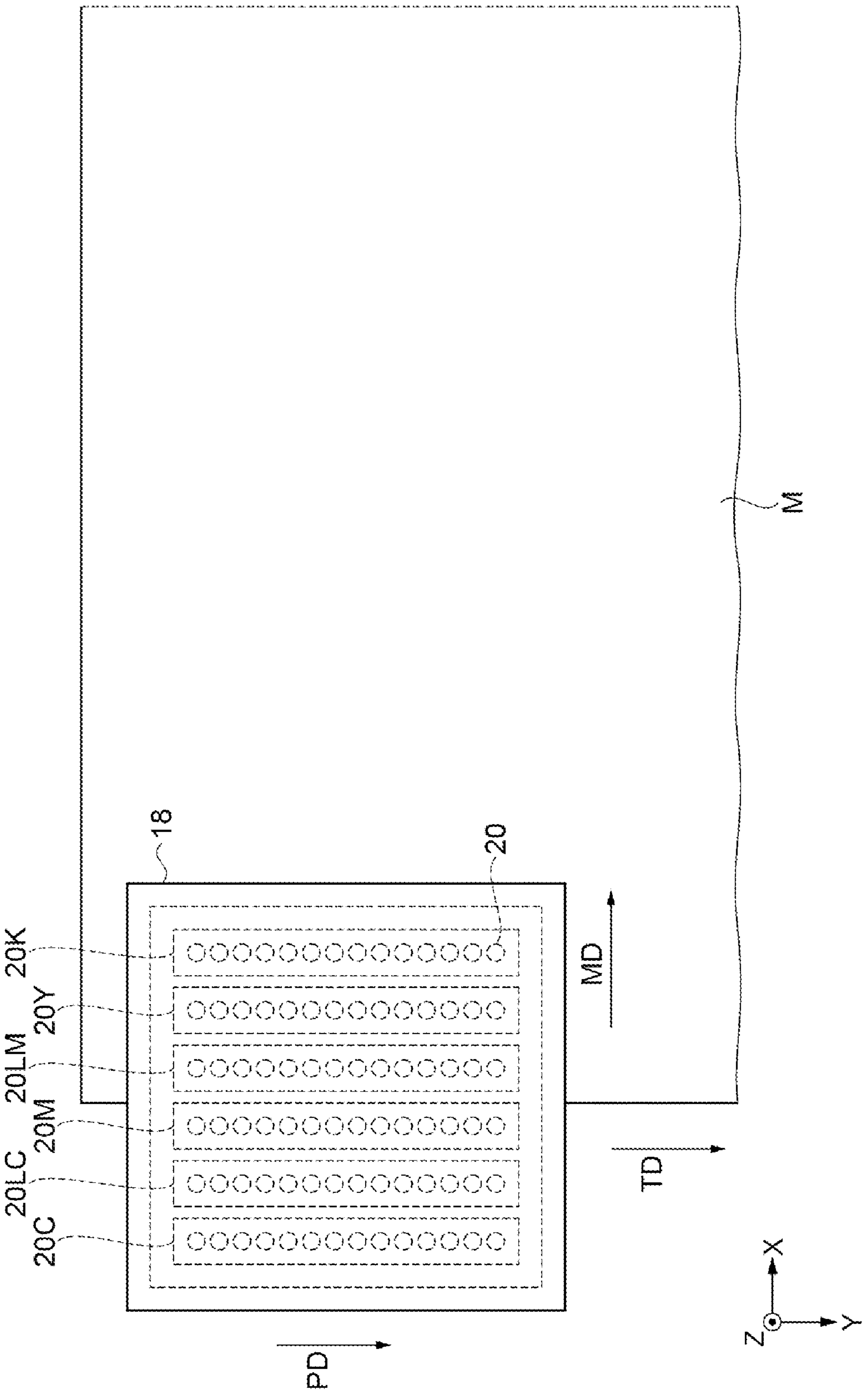
FIG. 3 is a diagram illustrating a relationship between a printing medium and a printing head.

FIG. 3 illustrates a relationship between the printing medium M and the printing head 18. In FIG. 3, the carriage 17 and the carriage support shaft 19 are omitted. The printing head 18 illustrated in FIG. 3 prints an image on the printing medium M by moving in the movement direction MD. The movement direction MD corresponds to an example of a first direction. The movement direction MD illustrated in FIG. 3 corresponds to the +X direction. The plurality of ink nozzles 20 are disposed in the surface of the printing head 18 that faces the printing medium M. The plurality of ink nozzles 20 form a plurality of nozzle rows. The ink nozzles 20 illustrated in FIG. 3 form a cyan ink nozzle row 20C, a light cyan ink nozzle row 20LC, a magenta ink nozzle row 20M, a light magenta ink nozzle row 20LM, a yellow ink nozzle row 20Y, and a black ink nozzle row 20K.

The cyan ink nozzle row 20C includes the plurality of ink nozzles 20 arranged along the nozzle arrangement direction PD illustrated in FIG. 3. The nozzle arrangement direction PD illustrated in FIG. 3 is the same as the conveyance direction TD, but this is not limitative. The nozzle arrangement direction PD is a direction different from the movement direction MD. The ink nozzle 20 included in the cyan ink nozzle row 20C can eject cyan ink. The cyan ink is supplied to the printing head 18 from the ink tank or the ink cartridge not illustrated in the drawing. The cyan ink supplied to the printing head 18 is ejected by the ink nozzle 20 included in the cyan ink nozzle row 20C.

The light cyan ink nozzle row 20LC includes the plurality of ink nozzles 20 arranged along the nozzle arrangement direction PD. The ink nozzle 20 included in the light cyan ink nozzle row 20LC can eject light cyan ink. The light cyan ink is supplied to the printing head 18 from the ink tank or the ink cartridge not illustrated in the drawing. The light cyan ink supplied to the printing head 18 is ejected by the ink nozzle 20 included in the light cyan ink nozzle row 20LC.

The magenta ink nozzle row 20M includes the plurality of ink nozzles 20 arranged along a nozzle arrangement direction PD. The ink nozzle 20 included in the magenta ink nozzle row 20M can eject magenta ink. The magenta ink is supplied to the printing head 18 from the ink tank or the ink cartridge not illustrated in the drawing. The magenta ink supplied to the printing head 18 is ejected by the ink nozzle 20 included in the magenta ink nozzle row 20M.

The light magenta ink nozzle row 20LM includes the plurality of ink nozzles 20 arranged along the nozzle arrangement direction PD. The ink nozzle 20 included in the light magenta ink nozzle row 20LM can eject light magenta ink. The light magenta ink is supplied to the printing head 18 from the ink tank or the ink cartridge not illustrated in the drawing. The light magenta ink supplied to the printing head 18 is ejected by the ink nozzle 20 included in the light magenta ink nozzle row 20LM.

The yellow ink nozzle row 20Y includes the plurality of ink nozzles 20 arranged along the nozzle arrangement direction PD. The ink nozzle 20 included in the yellow ink nozzle row 20Y can eject yellow ink. The yellow ink is supplied to the printing head 18 from the ink tank or the ink cartridge not illustrated in the drawing. The yellow ink supplied to the printing head 18 is ejected by the ink nozzle 20 included in the yellow ink nozzle row 20Y.

The black ink nozzle row 20K includes the plurality of ink nozzles 20 arranged along the nozzle arrangement direction PD. The ink nozzle 20 included in the black ink nozzle row 20K can eject black ink. The black ink is supplied to the printing head 18 from the ink tank or the ink cartridge not illustrated in the drawing. The black ink supplied to the printing head 18 is ejected by the ink nozzle 20 included in the black ink nozzle row 20K.

The printing head 18 illustrated in FIG. 3 can eject six types of ink, but this is not limitative. The printing head 18 may be configured to eject five or less types of ink, or seven or more types of ink. The number of the ink nozzles 20 included in each nozzle row illustrated in FIG. 3 is 14, but this is not limitative. The number of the ink nozzles 20 included in each nozzle row may be smaller than 14, or may be greater than 14. The number of the ink nozzles 20 included in each nozzle row may be appropriately set.

Figure 4:
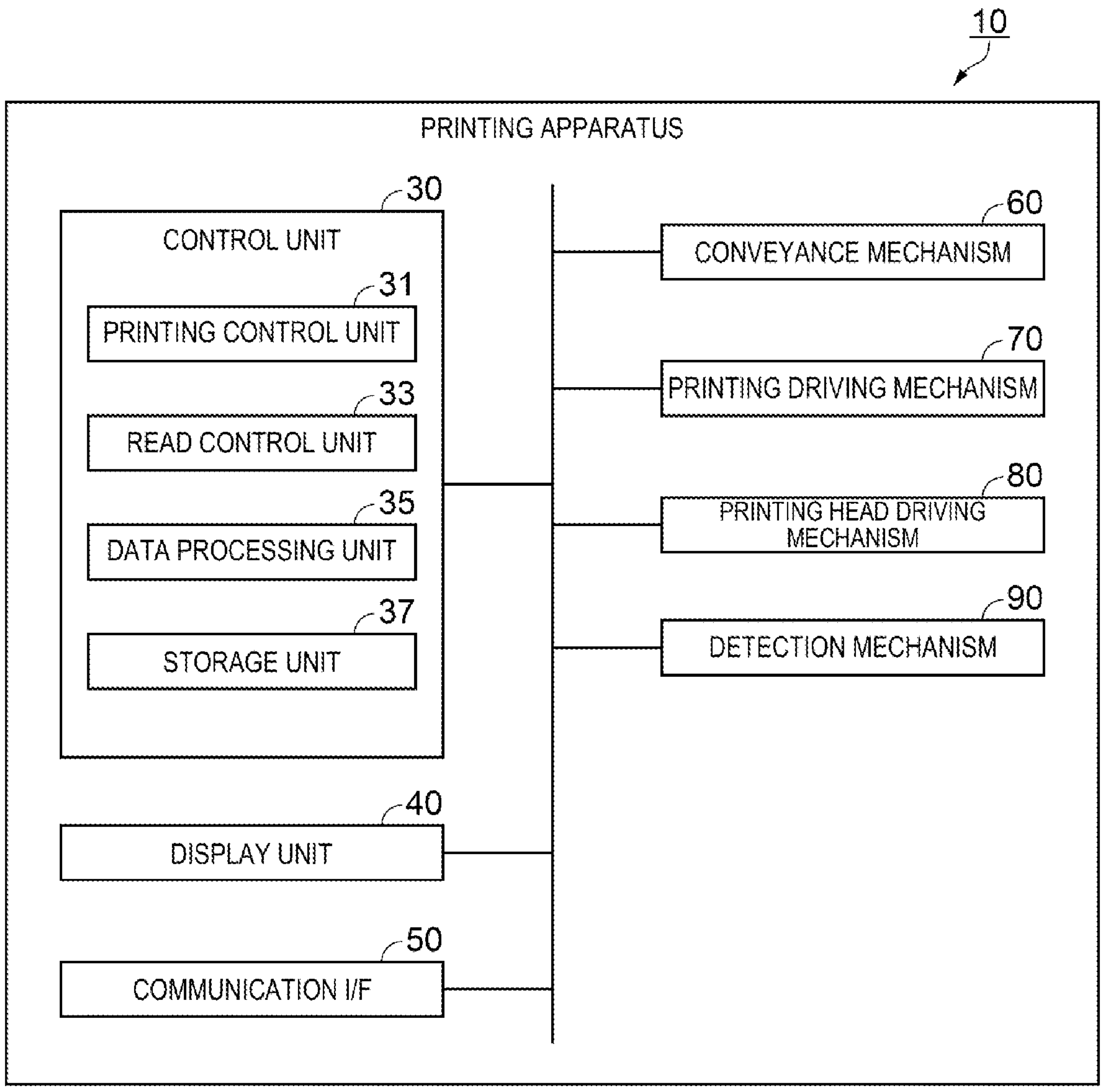
FIG. 4 is a diagram illustrating a function block of a printing apparatus.

FIG. 4 is a diagram illustrating a block configuration of the printing apparatus 10. The printing apparatus 10 includes a control unit 30, a display unit 40, a communication interface 50, a conveyance mechanism 60, a printing driving mechanism 70, a printing head driving mechanism 80, and a detection mechanism 90. FIG. 4 illustrates interface as I/F.

The control unit 30 is a controller that controls each unit of the printing apparatus 10. The control unit 30 includes a control processor such as central processing unit (CPU), a random access memory (RAM), a read only memory (ROM) and the like. The control unit 30 operates as a functional unit by executing a program using the control processor. The RAM and the ROM function as work areas. The control unit 30 corresponds to an example of a control unit.

The control unit 30 includes a storage unit 37. The storage unit 37 stores various programs operated by the control unit 30, and various data. The storage unit 37 stores a test pattern image and correction data described later and the like in the form of data. The RAM and the ROM may operate as the storage unit 37, or a magnetic storage device such as a hard disk drive (HDD), a semiconductor memory and the like may be provided.

The control unit 30 functions as a printing control unit 31, a read control unit 33, and a data processing unit 35 by executing the program. The printing control unit 31, the read control unit 33, and the data processing unit 35 are functional units.

The printing control unit 31 controls the printing driving mechanism 70 and the printing head driving mechanism 80. The printing control unit 31 can control the printing mechanism 16 by controlling the printing driving mechanism 70 and the printing head driving mechanism 80. The printing control unit 31 prints an image on the printing medium M. The printing control unit 31 acquires printing data. The printing data is stored in the storage unit 37. Alternatively, the printing data is acquired from the external apparatus through the communication interface 50. The printing control unit 31 controls the printing driving mechanism 70 and the printing head driving mechanism 80 so as to print an image on the printing medium M on the basis of the printing data.

The read control unit 33 controls the reading sensor 15 included in the detection mechanism 90. The read control unit 33 controls the reading sensor 15 so as to read the image printed on the printing medium M. The read image is the test pattern image and the like. With the reading sensor 15, the read control unit 33 receives the read read data from the reading sensor 15. The received read data is transmitted to the data processing unit 35.

The data processing unit 35 executes a computation of various data on the basis of the data detected by the detection mechanism 90. The data processing unit 35 receives the read data read by the reading sensor 15, and performs the computation using the data. When the received read data is the read data of the test pattern image, the data processing unit 35 performs generation of correction data, determination of the defective nozzle and the like on the basis of the read data. The data processing unit 35 corresponds to an example of a computation unit.

The display unit 40 displays various indications under the control of the control unit 30. The display unit 40 includes a display. The display is composed of a liquid crystal display, an organic electro-luminescence (EL) or the like. The display may have a touch input function. The display unit 40 displays a setting screen for various settings such as printing conditions, an instruction screen for instructing printing, and the like.

The communication interface 50 is communicatively connected to an external apparatus. The communication interface 50 connects to the external apparatus in a wired or wireless manner in accordance with a predetermined communication protocol. The communication interface 50 receives printing data, a printing setting condition, a program and the like from the external apparatus. The communication interface 50 transmits the printing result, the maintenance data and the like of the printing apparatus 10 to the external apparatus.

The conveyance mechanism 60 conveys the printing medium M in the conveyance direction TD, or the direction opposite to the conveyance direction TD. The conveyance mechanism 60 includes the feed shaft 11, the feed roller pair 13, the conveyance roller pair 25, and the winding shaft 27. The conveyance mechanism 60 conveys the printing medium M under the control of the printing control unit 31 or the read control unit 33. When the printing apparatus 10 performs printing on the printing medium M, the conveyance mechanism 60 conveys the printing medium M in the conveyance direction TD under the control of the printing control unit 31. When the reading sensor 15 reads the test pattern image printed on the printing medium M, the conveyance mechanism 60 conveys the printing medium M in the direction opposite to the conveyance direction TD under the control of the read control unit 33.

The printing driving mechanism 70 drives the printing mechanism 16. The printing driving mechanism 70 includes the carriage 17, a carriage driving mechanism, and the carriage support shaft 19. The printing driving mechanism 70 moves the carriage 17 in the movement direction MD. With the carriage 17 moving in the movement direction MD, the plurality of ink nozzles 20 included in the printing head 18 scan the printing medium M. With the carriage 17, the printing mechanism 16 scans the plurality of ink nozzles 20. The scanning ink nozzle 20 forms an image on the printing medium M by ejecting ink. In the case where the printing mechanism 16 is a line head, the printing driving mechanism 70 may operate as a correction mechanism for correcting skew of the printing medium M.

The printing head driving mechanism 80 controls the ink ejection of the ink nozzle 20 under the control of the printing control unit 31. The printing head driving mechanism 80 includes a driving element such as a piezoelectric element disposed in the printing head 18. Each ink nozzle 20 ejects ink through the driving of the printing head driving mechanism 80. The printing head driving mechanism 80 performs printing on the printing medium M by driving the plurality of ink nozzles 20. The printing head driving mechanism 80 may drive a predetermined ink nozzle 20 of the plurality of ink nozzles 20 as a test pattern nozzle. The test pattern nozzle is used when printing a test pattern image. The test pattern nozzle is not driven when printing an image other than the test pattern image. The test pattern nozzle is a nozzle dedicated to printing of the test pattern image. The test pattern nozzle corresponds to an example of an inspection nozzle. The ejection characteristics of the test pattern nozzle are acquired in advance at the time of factory shipment and the like. The acquired ejection characteristics are stored in the storage unit 37. The ejection characteristics correspond to the condition of the test pattern nozzle. One or more test pattern nozzles may be disposed for each nozzle row.

The detection mechanism 90 detects various operations of the printing apparatus 10, the presence/absence of the printing medium M and the like. The detection mechanism 90 includes various sensors such as the reading sensor 15, and a paper detection sensor and an ink residual quantity sensor not illustrated in the drawing. The detection mechanism 90 is driven under the control of the control unit 30. The reading sensor 15 reads the image printed on the printing medium M on the basis of the instruction of the read control unit 33 in the control unit 30. The reading operation of the reading sensor 15 corresponds to the detection operation. The detection mechanism 90 transmits detection data detected by various sensors to the control unit 30. The reading sensor 15 transmits the read data to the control unit 30.

Figure 5:
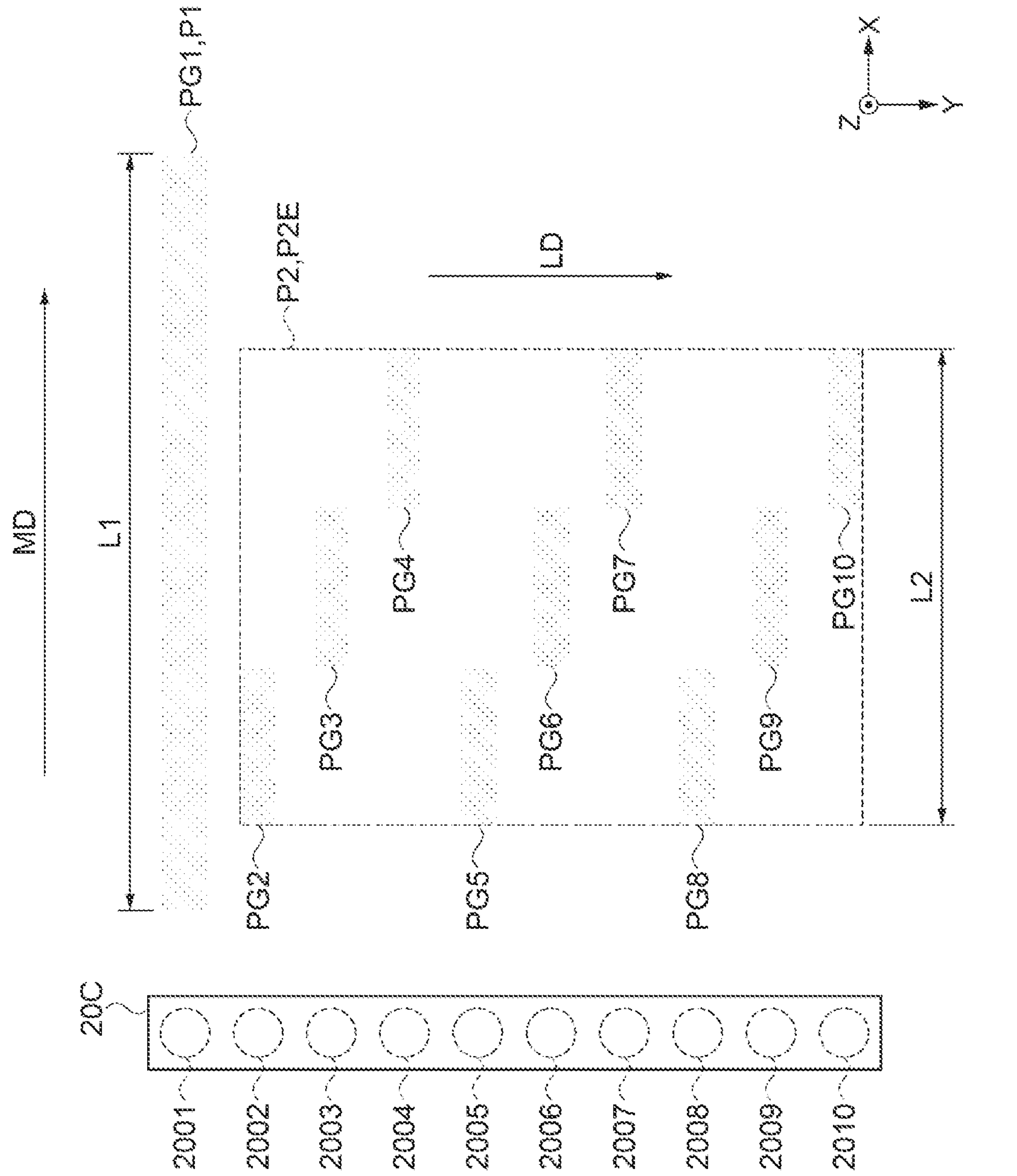
FIG. 5 is a diagram schematically illustrating a test pattern image.

FIG. 5 schematically illustrates a test pattern image. The test pattern image is printed on the printing medium M under the control of the printing control unit 31. The test pattern image is printed by the printing mechanism 16, and thus formed on the printing medium M. The test pattern image is printed on the printing medium M when inspecting the ink ejection defect of the ink nozzle 20. The test pattern image is printed at the time of power on of the printing apparatus 10, at a predetermined time or time interval set in advance, at the time of receiving an instruction from the user, or the like. The test pattern image illustrated in FIG. 5 is printed by the ink nozzle 20 included in the cyan ink nozzle row 20C. When the test pattern image is printed by the nozzle row other than the cyan ink nozzle row 20C, the mode of the test pattern image is the same as the mode of the test pattern image printed by the cyan ink nozzle row 20C. In FIG. 5, the test pattern image printed by the nozzle row other than the cyan ink nozzle row 20C is omitted.

FIG. 5 illustrates the cyan ink nozzle row 20C including the plurality of ink nozzles 20. Ten ink nozzles 20 are included in the cyan ink nozzle row 20C illustrated in FIG. 5, but this is not limitative. It suffices that three or more ink nozzles 20 are included in the cyan ink nozzle row 20C. The number of ink nozzles 20 included in the nozzle row may be appropriately changed.

The ink nozzles 20 included in the cyan ink nozzle row 20C illustrated in FIG. 5 are a first ink nozzle 2001, a second ink nozzle 2002, a third ink nozzle 2003, a fourth ink nozzle 2004, a fifth ink nozzle 2005, a sixth ink nozzle 2006, a seventh ink nozzle 2007, an eighth ink nozzle 2008, a ninth ink nozzle 2009, and a tenth ink nozzle 2010. Each of the first ink nozzle 2001 to the tenth ink nozzle 2010 prints the pattern image included in the test pattern image on the printing medium M.

The first ink nozzle 2001 prints a first pattern image PG1. The second ink nozzle 2002 prints a second pattern image PG2. The third ink nozzle 2003 prints a third pattern image PG3. The fourth ink nozzle 2004 prints a fourth pattern image PG4. The fifth ink nozzle 2005 prints a fifth pattern image PG5. The sixth ink nozzle 2006 prints a sixth pattern image PG6. The seventh ink nozzle 2007 prints a seventh pattern image PG7. The eighth ink nozzle 2008 prints an eighth pattern image PG8. The ninth ink nozzle 2009 prints a ninth pattern image PG9. The tenth ink nozzle 2010 prints a tenth pattern image PG10.

FIG. 5 illustrates each ink nozzle 20 included in the cyan ink nozzle row 20C at a position corresponding to each pattern image. When each ink nozzle 20 included in the cyan ink nozzle row 20C performs single scanning in the movement direction MD with the carriage 17, each pattern image illustrated in FIG. 5 is printed. In FIG. 5, the movement direction MD corresponds to the +X direction. The single scanning corresponds to an example of first scanning. When each ink nozzle 20 performs multiple scans, the printing apparatus 10 may print each pattern image. For example, when each ink nozzle 20 performs predetermined single scanning among multiple scans, the printing apparatus 10 prints the first pattern image PG1. When each ink nozzle 20 performs scanning different from the predetermined single scanning, the printing apparatus 10 may print the second pattern image PG2 to the tenth pattern image PG10. The predetermined single scanning corresponds to an example of first scanning, and scanning different from the predetermined single scanning corresponds to an example of scanning different from the first scanning. Each pattern image illustrated in FIG. 5 is a continuous line image in the movement direction MD, but this is not limitative. Each pattern image may be a partially omitted line image such as a broken line. The configuration of the pattern image is not limited as long as the image enables the detection of ejection defects of the ink nozzle 20. Preferably, the pattern image is a continuous line image. The length of each pattern image in the movement direction MD is the distance between both ends in the movement direction MD.

FIG. 5 illustrates a test pattern image of a case when there is no defective nozzle in the ink nozzles 20 of the first ink nozzle 2001 to the tenth ink nozzle 2010. The first ink nozzle 2001 prints the first pattern image PG1 with a first test pattern length L1 in the movement direction MD. The first pattern image PG1 is a first test pattern P1. The first test pattern P1 corresponds to an example of a first pattern. The first test pattern length L1 corresponds to an example of a first length. In FIG. 5, among the ink nozzles 20 included in the cyan ink nozzle row 20C, the first ink nozzle 2001 prints the first test pattern P1. The first ink nozzle 2001 corresponds to an example of a first nozzle. The second ink nozzle 2002 to the tenth ink nozzle 2010 print the second pattern image PG2 to the tenth pattern image PG10, respectively. The pattern image lengths of the second pattern image PG2 to the tenth pattern image PG10 are shorter than the first test pattern length L1. The image group including the pattern images of the second pattern image PG2 to the tenth pattern image PG10 is a second test pattern P2. The second test pattern P2 corresponds to an example of a second pattern. The second test pattern P2 is composed of a plurality of pattern images within the range surrounded by the dotted line illustrated in FIG. 5. The region surrounded by the dotted line illustrated in FIG. 5 is a second test pattern region P2E. The second test pattern region P2E corresponds to an example of a region on a medium where a second pattern is formed.

The second test pattern P2 includes the pattern images of the second pattern image PG2 to the tenth pattern image PG10. The third pattern image PG3 is printed with a displacement with respect to the second pattern image PG2 in the movement direction MD and a longitudinal direction LD that intersects the movement direction MD. The longitudinal direction LD is a direction that intersects the width direction of the printing medium M. The longitudinal direction LD illustrated in FIG. 5 coincides with the conveyance direction TD and the +Y direction. The longitudinal direction LD corresponds to an example of a second direction. The fourth pattern image PG4 is printed with a displacement with respect to the second pattern image PG2 and the third pattern image PG3 in the movement direction MD and the longitudinal direction LD. The fifth pattern image PG5 and the eighth pattern image PG8 are printed with a displacement with respect to the second pattern image PG2 in the longitudinal direction LD. The sixth pattern image PG6 and the ninth pattern image PG9 are printed with a displacement with respect to the third pattern image PG3 in the longitudinal direction LD. The seventh pattern image PG7 and the tenth pattern image PG10 are printed with a displacement with respect to the fourth pattern image PG4 in the longitudinal direction LD. The printing positions of the second pattern image PG2, the third pattern image PG3 and the fourth pattern image PG4 are an arrangement of a step form with a displacement in the movement direction MD and the longitudinal direction LD. The printing positions of the fifth pattern image PG5, the sixth pattern image PG6 and the seventh pattern image PG7 are an arrangement of a step form with a displacement in the movement direction MD and the longitudinal direction LD. The printing positions of the eighth pattern image PG8, the ninth pattern image PG9 and the tenth pattern image PG10 are an arrangement of a step form with a displacement in the movement direction MD and the longitudinal direction LD. The arrangement of the step form with the displacement in the movement direction MD and the longitudinal direction LD corresponds to an example of image arrangement of a step form with a displacement in the first direction and the second direction.

The second test pattern region P2E is a region with a second test pattern width L2 along the movement direction MD and a second test pattern length along the longitudinal direction LD. The second test pattern width L2 corresponds to an example of a second length. The second test pattern width L2 is the distance between both ends of the second pattern image PG2 to the tenth pattern image PG10 in the movement direction MD. In the second test pattern P2 illustrated in FIG. 5, the second test pattern width L2 is the distance between the −X direction end portion of the second pattern image PG2 and the +X direction end portion of the fourth pattern image PG4. The second test pattern length illustrated in FIG. 5 is the distance between the −Y direction end portion of the second pattern image PG2 and the +Y direction end portion of the tenth pattern image PG10.

The second test pattern P2 is printed by the ink nozzles 20 of the second ink nozzle 2002 to the tenth ink nozzle 2010. The ink nozzles 20 of the second ink nozzle 2002 to the tenth ink nozzle 2010 correspond to an example of two or more nozzles different from the first nozzle. With nine ink nozzles 20 of the ink nozzles 20 included in the cyan ink nozzle row 20C illustrated in FIG. 5, the printing apparatus 10 prints the second test pattern P2. The number of ink nozzles 20 for printing the second test pattern P2 is not limited to nine. It suffices that the number of ink nozzles 20 for printing the second test pattern P2 is two or more. The number of ink nozzles 20 for printing the second test pattern P2 may be appropriately changed.

As illustrated in FIG. 5, the first test pattern length L1 is longer than the second test pattern width L2. The printing apparatus 10 can accurately determine the defective nozzle by printing the test pattern image including the first test pattern P1 and the second test pattern P2.

Figure 6:
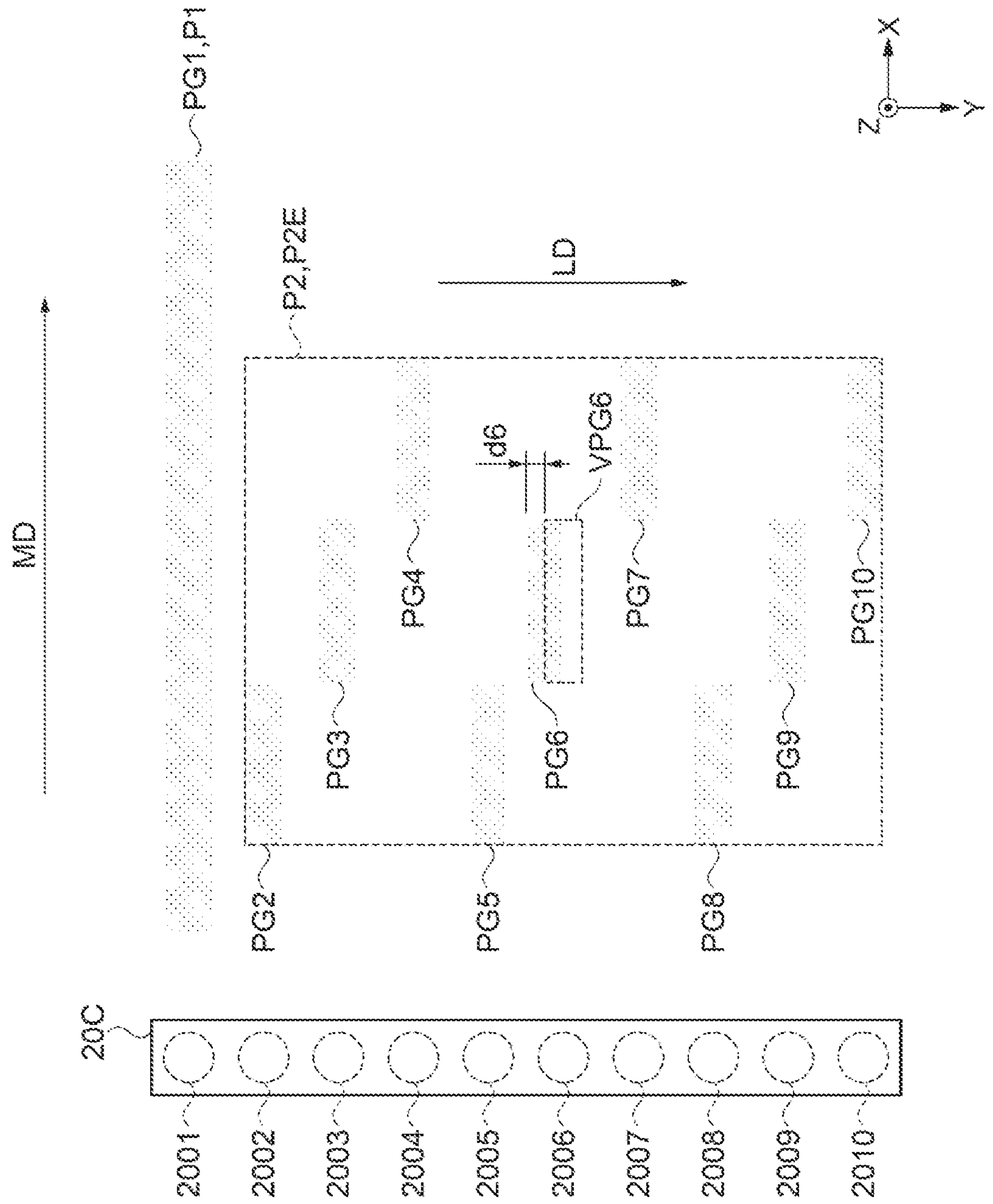
FIG. 6 is a diagram illustrating an example of a test pattern image printed by the printing apparatus.
Figure 7:
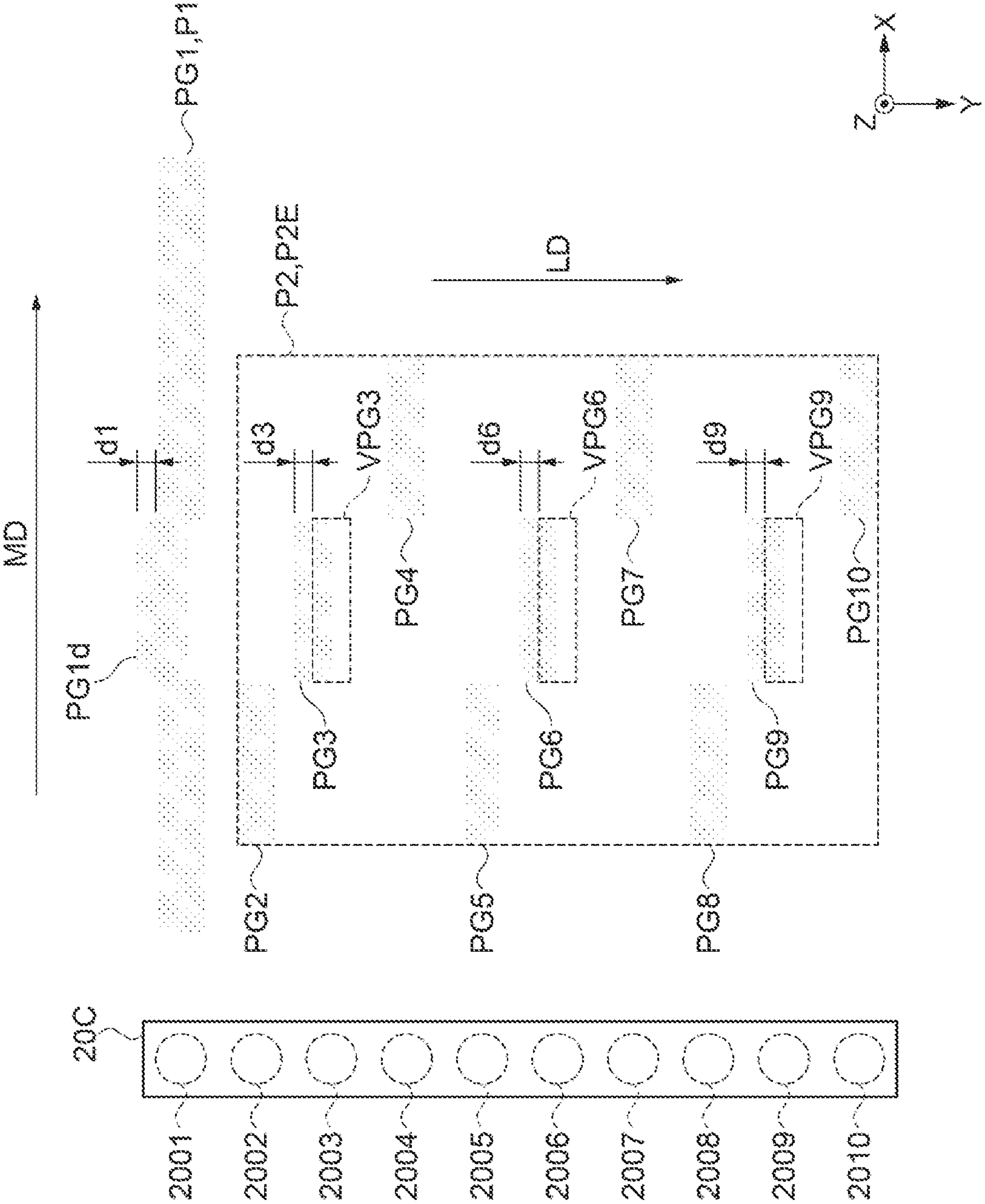
FIG. 7 is a diagram illustrating an example of a test pattern image printed by the printing apparatus.
Figure 8:
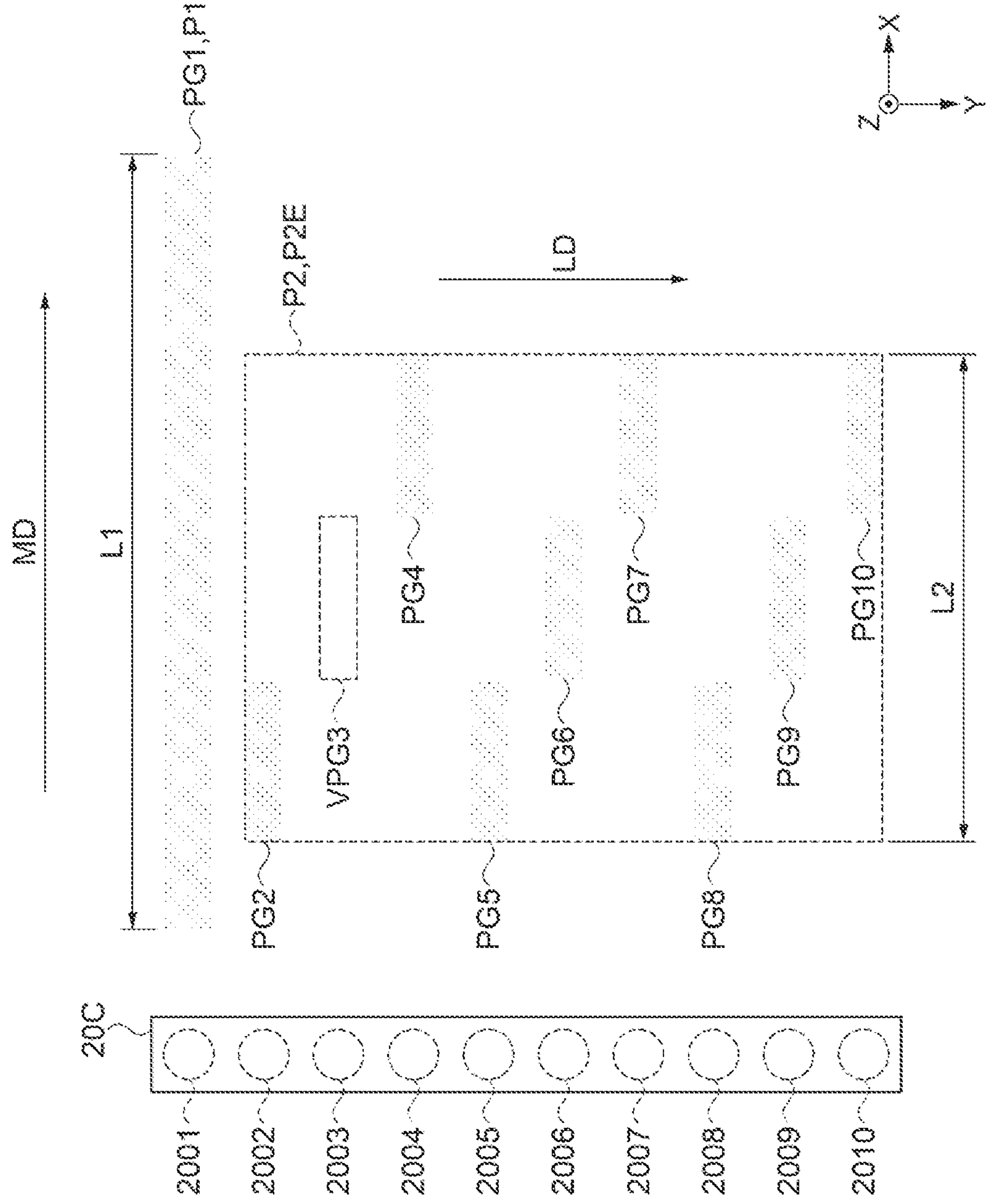
FIG. 8 is a diagram illustrating an example of a test pattern image printed by the printing apparatus.

FIG. 6, FIG. 7 and FIG. 8 illustrate an example of the test pattern image printed by the printing apparatus 10. As in FIG. 5, FIG. 6, FIG. 7 and FIG. 8 illustrate the test pattern image printed by the cyan ink nozzle row 20C. As in FIG. 5, FIG. 6, FIG. 7 and FIG. 8 illustrate the ink nozzle 20 corresponding to each pattern image included in the test pattern image.

FIG. 6 illustrates a test pattern image in which the printing position of the sixth pattern image PG6 is different from the printing position of the sixth pattern image PG6 included in the test pattern image illustrated in FIG. 5. FIG. 6 illustrates a virtual sixth pattern image VPG6 representing the printing position of the sixth pattern image PG6 illustrated in FIG. 5.

As illustrated in FIG. 6, the printed sixth pattern image PG6 and the virtual sixth pattern image VPG6 are displaced by a sixth distance d6 along the longitudinal direction LD. The first pattern image PG1 that is the first test pattern P1 is printed as a straight line. When the first pattern image PG1 and the sixth pattern image PG6 are printed through single scanning of the cyan ink nozzle row 20C, a part of the first pattern image PG1 and the sixth pattern image PG6 are printed at the same timing. Since the first pattern image PG1 is printed as a straight line, the printing apparatus 10 can determine that a jetting curve is caused at the sixth ink nozzle 2006 that prints the sixth pattern image PG6.

In some cases, the printing apparatus 10 prints the first pattern image PG1 through predetermined single scanning of the cyan ink nozzle row 20C, and prints the sixth pattern image PG6 through scanning of the cyan ink nozzle row 20C different from the predetermined single scan. A part of the first pattern image PG1 and the sixth pattern image PG6 are printed at the same position in the movement direction MD. For example, in the case where waviness is caused in the carriage support shaft 19, the first pattern image PG1 becomes a line image affected by the waviness. Since the first pattern image PG1 illustrated in FIG. 6 is printed as a straight line, the printing apparatus 10 can determine that a jetting curve is caused at the sixth ink nozzle 2006 that prints the sixth pattern image PG6.

FIG. 7 illustrates a test pattern image in which the printing positions of the third pattern image PG3, the sixth pattern image PG6, and the ninth pattern image PG9 are different from the printing positions of the third pattern image PG3, the sixth pattern image PG6, and the ninth pattern image PG9 included in the test pattern image illustrated in FIG. 5. FIG. 7 illustrates a virtual third pattern image VPG3, the virtual sixth pattern image VPG6, and a virtual ninth pattern image VPG9. The virtual third pattern image VPG3 indicates the printing position of the third pattern image PG3 illustrated in FIG. 5. The virtual sixth pattern image VPG6 indicates the printing position of the sixth pattern image PG6 illustrated in FIG. 5. The virtual ninth pattern image VPG9 indicates the printing position of the ninth pattern image PG9 illustrated in FIG. 5. The test pattern image illustrated in FIG. 7 is printed on the printing medium M through single scanning of the cyan ink nozzle row 20C.

As illustrated in FIG. 7, the printed third pattern image PG3 and the virtual third pattern image VPG3 are displaced by a third distance d3 along the longitudinal direction LD. The printed sixth pattern image PG6 and the virtual sixth pattern image VPG6 are displaced by the sixth distance d6 along the longitudinal direction LD. The printed ninth pattern image PG9 and the virtual ninth pattern image VPG9 are displaced by a ninth distance d9 along the longitudinal direction LD. As illustrated in FIG. 7, a part of the first pattern image PG1 is displaced by a first distance d1 along the longitudinal direction LD with respect to the other region of the first pattern image PG1. A part of the first pattern image PG1 whose printing position is displaced is hereinafter referred to as first pattern displacement image PG1*d*. The printing position of the first pattern displacement image PG1*d* corresponds to the printing positions of the third pattern image PG3, the sixth pattern image PG6, and the ninth pattern image PG9. The first pattern displacement image PG1*d* is printed at the same timing as the third pattern image PG3, the sixth pattern image PG6, and the ninth pattern image PG9. As an example, the first distance d1, the third distance d3, the sixth distance d6, and the ninth distance d9 illustrated in FIG. 7 are the same value within a range of the error. In this case, the test pattern image illustrated in FIG. 7 indicates that vibration is caused at the printing mechanism 16 when the first pattern displacement image PG1*d* is printed. Vibration occurs at the printing mechanism 16 due to factors such as shocks to the printing apparatus 10 and vibration generated in the vicinity of the location where the printing apparatus 10 is installed and the like. With the test pattern image illustrated in FIG. 7, the printing apparatus 10 can determine the presence or absence and degree of the influence of disturbances on the printing apparatus 10.

FIG. 8 illustrates a test pattern image in which the third pattern image PG3 is not printed. FIG. 8 illustrates the virtual third pattern image VPG3 indicating the printing position of the third pattern image PG3 illustrated in FIG. 5. The test pattern image illustrated in FIG. 8 indicates that the third ink nozzle 2003 that prints the third pattern image PG3 is in a state where it cannot eject the ink. With the test pattern image illustrated in FIG. 8, the printing apparatus 10 can determine that an ink ejection defect is caused at the third ink nozzle 2003.

As described above, the printing apparatus 10 includes the printing mechanism 16 that moves with respect to the printing medium M in the movement direction MD and can eject ink, and the control unit 30 that can control the printing mechanism 16. The printing mechanism 16 includes the plurality of ink nozzles 20 that are arranged in the nozzle arrangement direction PD different from the movement direction MD and can eject ink. The control unit 30 uses the first ink nozzle 2001 among the plurality of ink nozzles 20 to print the first test pattern P1 with the first test pattern length L1 in the movement direction MD, and uses two or more ink nozzles 20 different from the first ink nozzle 2001 to print the second test pattern P2 including the image arrangement of a step form with a displacement in the movement direction MD and the longitudinal direction LD different from the movement direction MD, the second test pattern region P2E where the second test pattern P2 is printed on the printing medium M has the second test pattern width L2 in the movement direction MD, and the first test pattern length L1 is greater than the second test pattern width L2.

By determining whether the first test pattern P1 and the second test pattern P2 have equivalent displacement of the ink impinging position at the same position in the movement direction MD, the presence/absence of print blur due to vibration and waviness of the carriage support shaft 19 can be acquired. With the combination of the first test pattern P1 and the second test pattern P2, the printing apparatus 10 can estimate the ink impinging position, with the influence of the waviness of the carriage support shaft 19 and the print blur eliminated.

The printing mechanism 16 includes the carriage 17 that causes the plurality of ink nozzles 20 to perform scanning in the movement direction MD, and, when the carriage 17 performs a single scan, the control unit 30 causes it to form the first test pattern P1 and the second test pattern P2.

The printing apparatus 10 can form a test pattern image that enables the detection of print blur due to reception of a sudden external force such as vibration applied to the printing apparatus 10 in addition to waviness of the carriage support shaft 19.

The printing mechanism 16 includes the carriage 17 that performs scanning of the plurality of ink nozzles 20 in the movement direction MD. When the carriage 17 performs a single scan, the control unit 30 causes it to form the first test pattern P1, and when the carriage 17 performs scanning different from the single scanning, the control unit 30 causes it to form the second test pattern P2.

The printing apparatus 10 can provide a sufficient distance and drying time between the first test pattern P1 and the second test pattern P2. The printing apparatus 10 can form a test pattern image that suppresses a situation where the second test pattern P2 is erroneously detected as being not ejected due to the first test pattern P1 and the second test pattern P2 that have spread and merged with each other.

The first ink nozzle 2001 that prints the first test pattern P1 may be used when printing an image, or may be used as the test pattern nozzle. The ink nozzles 20 of the second ink nozzle 2002 to the tenth ink nozzle 2010 print images. The ejection characteristics are measured in advance for the plurality of ink nozzles 20 included in the nozzle row. The ejection characteristics are, for example, the linearity of printing, the stability of ink ejection rate, and the like. The ink nozzle 20 with the highest ejection characteristics among the ink nozzles 20 whose ejection characteristics are measured may be stored in the storage unit 37 as a dedicated nozzle for printing the first test pattern P1. The printing apparatus 10 may control the ink nozzle 20 with the highest ejection characteristics as the ink nozzle 20 for printing the first test pattern P1 on the basis of the information stored in the storage unit 37.

Preferably, the first ink nozzle 2001 is an inspection nozzle whose condition is acquired in advance. When the ejection characteristics of the first ink nozzle 2001 used for the printing of the first test pattern P1 are secured, the printing apparatus 10 can make an evaluation including the influence of jetting curve for other ink nozzles 20 different from the first ink nozzle 2001.

Figure 9:
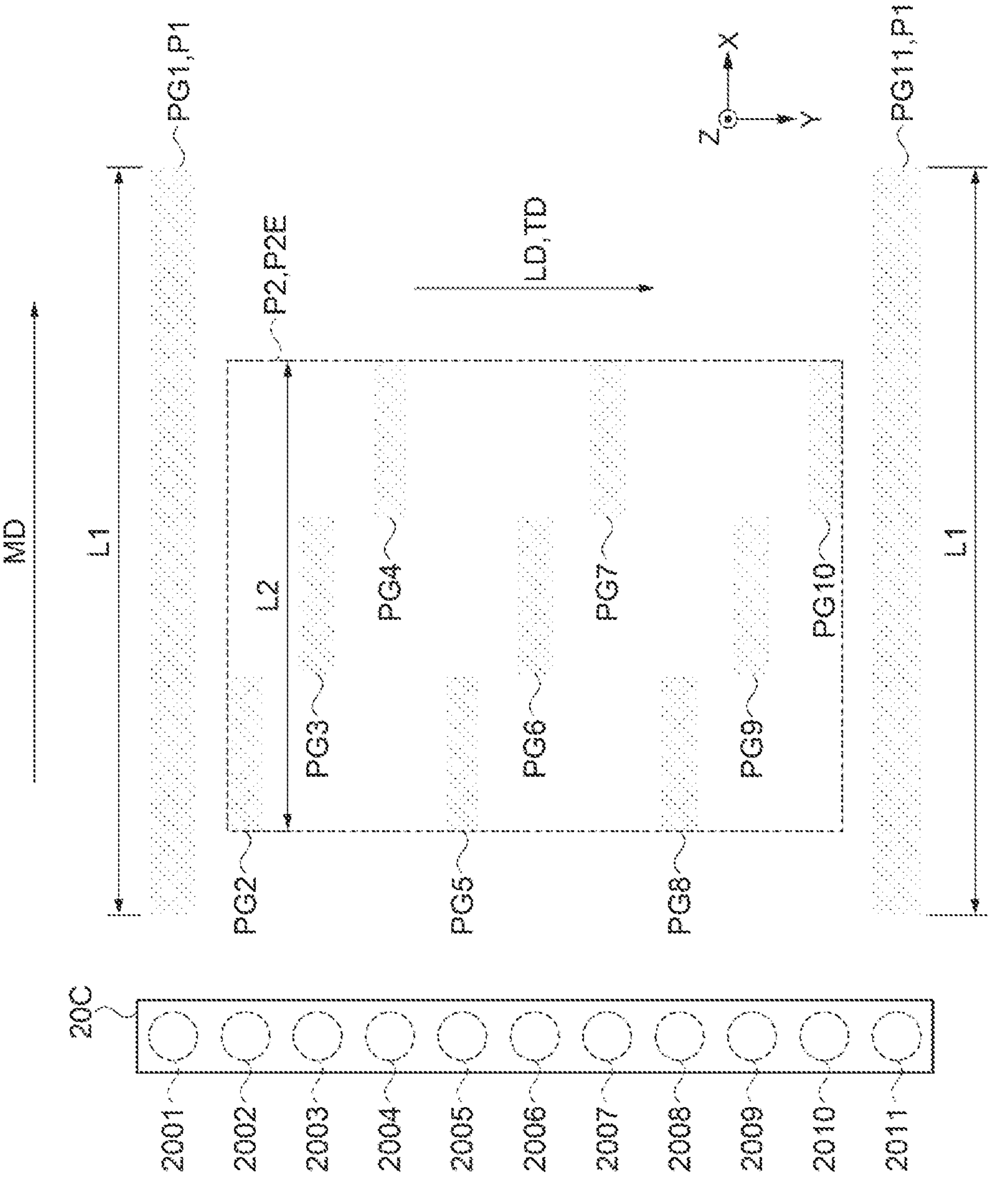
FIG. 9 is a diagram schematically illustrating a test pattern image.

FIG. 9 schematically illustrates another test pattern image. The test pattern image illustrated in FIG. 9 is printed under the control of the printing control unit 31, and thus formed on the printing medium M. The test pattern image illustrated in FIG. 9 is printed by the ink nozzle 20 included in the cyan ink nozzle row 20C. FIG. 9 illustrates the cyan ink nozzle row 20C. When the test pattern image is printed by the nozzle row other than the cyan ink nozzle row 20C, the mode of the test pattern image is the same as the mode of the test pattern image printed by the cyan ink nozzle row 20C. In FIG. 9, the test pattern image printed by the nozzle row other than the cyan ink nozzle row 20C is omitted.

The cyan ink nozzle row 20C illustrated in FIG. 9 includes eleven ink nozzles 20 of the first ink nozzle 2001 to an eleventh ink nozzle 2011. The cyan ink nozzle row 20C illustrated in FIG. 9 has the same configuration as the cyan ink nozzle row 20C illustrated in FIG. 5 except that the number of ink nozzles 20 differs. Each of the first ink nozzle 2001 to the eleventh ink nozzle 2011 prints the pattern image included in the test pattern image on the printing medium M.

The first ink nozzle 2001 to the tenth ink nozzle 2010 illustrated in FIG. 9 print the first pattern image PG1 to the tenth pattern image PG10 illustrated in FIG. 5. The eleventh ink nozzle 2011 prints an eleventh pattern image PG11. As illustrated in FIG. 9, the first ink nozzle 2001 to the eleventh ink nozzle 2011 are arranged from the upstream side to the downstream side in the conveyance direction TD of the printing medium M. The conveyance direction TD illustrated in FIG. 9 coincides with the nozzle arrangement direction PD and the longitudinal direction LD of the ink nozzle 20. The first ink nozzle 2001 is disposed most upstream in the conveyance direction TD. Among the plurality of pattern images, the first pattern image PG1 is located most upstream in the printing medium M. The eleventh ink nozzle 2011 is disposed most downstream in the conveyance direction TD. The eleventh pattern image PG11 is located most downstream among the plurality of pattern images in the printing medium M. The first ink nozzle 2001 and the eleventh ink nozzle 2011 are located at both ends in the conveyance direction TD.

FIG. 9 illustrates a test pattern image of a case where there is no defective nozzle in the ink nozzles 20 of the first ink nozzle 2001 to the eleventh ink nozzle 2011. The first ink nozzle 2001 prints the first pattern image PG1 with a first test pattern length L1 in the movement direction MD. The eleventh ink nozzle 2011 prints the eleventh pattern image PG11 with the first test pattern length L1 in the movement direction MD. Each of the first pattern image PG1 and the eleventh pattern image PG11 is the first test pattern P1. In FIG. 9, each of the first ink nozzle 2001 and the eleventh ink nozzle 2011 among the ink nozzles 20 included in the cyan ink nozzle row 20C prints the first test pattern P1. The eleventh ink nozzle 2011 corresponds to an example of a second nozzle. The second ink nozzle 2002 to the tenth ink nozzle 2010 print the second pattern image PG2 to the tenth pattern image PG10, respectively. The pattern image lengths of the second pattern image PG2 to the tenth pattern image PG10 are shorter than the first test pattern length L1. The image group including the pattern images of the second pattern image PG2 to the tenth pattern image PG10 is a second test pattern P2. The second test pattern P2 illustrated in FIG. 9 is the same as the second test pattern P2 illustrated in FIG. 5.

After printing the test pattern image on the printing medium M with the printing mechanism 16, the printing apparatus 10 illustrated in FIG. 1 conveys the printing medium M in the direction opposite to the conveyance direction TD. The printing medium M is conveyed from the printing mechanism 16 to the reading sensor 15. The direction opposite to the conveyance direction TD corresponds to an example of a third direction. The printing medium M moves relative to the reading sensor 15. The reading sensor 15 sequentially reads a plurality of pattern images included in the test pattern image printed on the printing medium M that is being conveyed. In the case of the test pattern image illustrated in FIG. 9, the reading sensor 15 reads the first pattern image PG1, the second pattern image PG2, the third pattern image PG3, the fourth pattern image PG4, the fifth pattern image PG5, the sixth pattern image PG6, the seventh pattern image PG7, the eighth pattern image PG8, the ninth pattern image PG9, the tenth pattern image PG10, and the eleventh pattern image PG11 in this order. The reading sensor 15 reads the test pattern image the first test pattern P1, the second test pattern P2, and the first test pattern P1 in this order. The test pattern images illustrated in FIG. 9 are configured and arranged such that the reading sensor 15 reads the first test pattern P1 before the second test pattern P2.

The printing medium M moves relative to the reading sensor 15. The control unit 30 forms the first test pattern P1 and the second test pattern P2 in an arrangement in which the first test pattern P1 is read by the reading sensor 15 before the second test pattern P2.

The first test pattern P1 is sent to the reading sensor 15 before the second test pattern P2, and thus the printing apparatus 10 can detect the presence/absence of waviness and vibration in advance.

The test pattern image illustrated in FIG. 9 may be used for the printing apparatus 10 that differs from the printing apparatus 10 illustrated in FIG. 1 in arrangement of the reading sensor 15. The test pattern image illustrated in FIG. 9 may be used for the printing apparatus 10 in which the reading sensor 15 is disposed between the printing mechanism 16 and the conveyance roller pair 25, for example. The printing apparatus 10 in which the reading sensor 15 is disposed downstream of the printing mechanism 16 prints the test pattern image at the printing mechanism 16 and thereafter conveys the printing medium M in the conveyance direction TD. The reading sensor 15 sequentially reads a plurality of pattern images included in the test pattern image printed on the printing medium M conveyed in the conveyance direction TD. In this case, the conveyance direction TD corresponds to an example of a third direction. The reading sensor 15 reads the eleventh pattern image PG11, the tenth pattern image PG10, the ninth pattern image PG9, the eighth pattern image PG8, the seventh pattern image PG7, the sixth pattern image PG6, the fifth pattern image PG5, the fourth pattern image PG4, the third pattern image PG3, the second pattern image PG2, and the first pattern image PG1 in this order. The reading sensor 15 reads the test pattern image the first test pattern P1, the second test pattern P2, and the first test pattern P1 in this order.

The printing medium M moves relative to the reading sensor 15. By using the eleventh ink nozzle 2011 different from the first ink nozzle 2001, the control unit 30 prints the first test pattern P1 different from the first test pattern P1 printed by using the first ink nozzle 2001. The control unit 30 prints the second test pattern P2 by using two or more ink nozzles 20 different from the first ink nozzle 2001 and the eleventh ink nozzle 2011. The first ink nozzle 2001 and the eleventh ink nozzle 2011 are located at both ends in the conveyance direction TD in the plurality of ink nozzles 20.

The designer of the printing apparatus 10 can use the test pattern image for the printing apparatus 10 with a different arrangement of the reading sensor 15.

Figure 10:
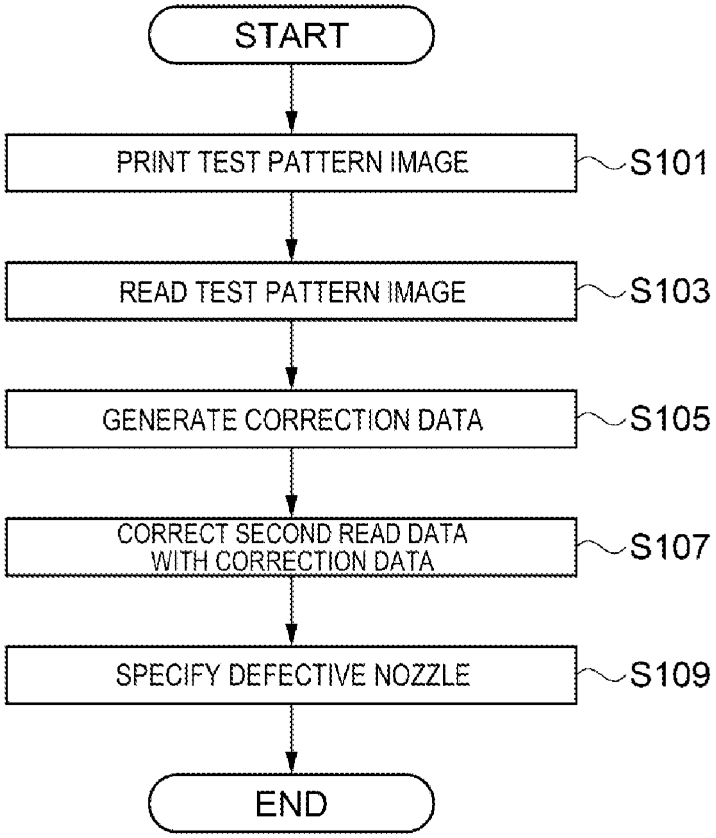
FIG. 10 is a diagram illustrating a step of detecting a defective nozzle.

FIG. 10 illustrates a step of detecting a defective nozzle. The printing apparatus 10 prints the test pattern image illustrated in FIG. 5 or FIG. 9 on the printing medium M. The printing apparatus 10 reads the test pattern image printed on the printing medium M with the reading sensor 15. The printing apparatus 10 detects the defective nozzle on the basis of the data read by the reading sensor 15. FIG. 10 illustrates a step in which the printing apparatus 10 prints the test pattern image and thereafter detects the defective nozzle on the basis of the reading result of the printed test pattern image.

At step S101, the printing apparatus 10 prints the test pattern image. The method of printing the test pattern image corresponds to an example of a recording method. The printing apparatus 10 illustrated in FIG. 1 moves the printing mechanism 16 in the movement direction MD illustrated in FIG. 3 relative to the printing medium M. The printing mechanism 16 includes the printing head 18 including the plurality of ink nozzles 20. The plurality of ink nozzles 20 make up a nozzle row arranged in the nozzle arrangement direction PD different from the movement direction MD. One nozzle row can eject ink of one color. The printing apparatus 10 moves the printing medium M relative to the printing mechanism 16. The printing apparatus 10 causes the plurality of ink nozzles 20 moving in the movement direction MD to scanning the printing medium M. The scanning plurality of ink nozzles 20 prints the test pattern image by ejecting ink to the printing medium M. The printing apparatus 10 forms the test pattern image on the printing medium M by printing the test pattern image with the printing mechanism 16.

The printing apparatus 10 prints the test pattern image on the printing medium M under the control of the control unit 30. With the printing mechanism 16, the control unit 30 prints the test pattern image including the first test pattern P1 and the second test pattern P2 on the printing medium M. As illustrated in FIG. 5, the control unit 30 prints the first test pattern P1 with the first ink nozzle 2001. As illustrated in FIG. 5, the first test pattern P1 is a pattern image with the first test pattern length L1 in the movement direction MD. The second test pattern P2 is composed of two or more pattern images printed by two or more ink nozzles 20. As illustrated in FIG. 5, the control unit 30 prints the second test pattern P2 by using the second ink nozzle 2002 to the tenth ink nozzle 2010. The second test pattern P2 is printed in the second test pattern region P2E with the second test pattern width L2 in the movement direction MD and the second test pattern length in the longitudinal direction LD that intersects the movement direction MD. As illustrated in FIG. 5, the two or more pattern images making up the second test pattern P2 are printed in an arrangement including an image arrangement of a step form with a displacement in the movement direction MD and the longitudinal direction LD. The control unit 30 performs the printing in such a manner that the first test pattern length L1 of the first test pattern P1 is greater than the second test pattern width L2 of the second test pattern P2.

The control unit 30 may print the first test pattern P1 and the second test pattern P2 through single scanning of the ink nozzle 20 with the carriage 17, or through multiple scans of the ink nozzle 20. By printing the first test pattern P1 and the second test pattern P2 through a single scan, the printing apparatus 10 can easily detect the vibration applied to the printing apparatus 10. The printing apparatus 10 may print the first test pattern P1 and the second test pattern P2 at different scans. The printing apparatus 10 may print the first test pattern P1 and the second test pattern P2 at shifted times.

The printing method of the printing apparatus 10 moves the printing medium M in the movement direction MD relative to the printing mechanism 16 including the plurality of ink nozzles 20, prints the first test pattern P1 with the first test pattern length L1 in the movement direction MD with the first ink nozzle 2001 among the plurality of ink nozzles 20, and prints the second test pattern P2 including an image arrangement of a step form with a displacement in the movement direction MD and the longitudinal direction LD that intersects the movement direction MD with two or more ink nozzles 20 different from the first ink nozzle 2001 among the plurality of ink nozzles 20. The second test pattern region P2E on the printing medium M where the second test pattern P2 is printed has the second test pattern width L2 in the movement direction MD, and the first test pattern length L1 is greater than the second test pattern width L2.

By determining whether the first test pattern P1 and the second test pattern P2 have equivalent displacement of the ink impinging position at the same position in the movement direction MD, and the presence/absence of waviness of the carriage support shaft 19 and print blur can be determined. With the combination of the first test pattern P1 and the second test pattern P2, the printing apparatus 10 can estimate the ink impinging position, with the influence of the waviness and print blur eliminated.

After printing the test pattern image at step S101, the printing apparatus 10 reads the test pattern image at step S103. The printing apparatus 10 reads the test pattern image with the reading sensor 15. The reading sensor 15 transmits the read data to the control unit 30. The reading result includes first read data obtained by reading the first test pattern P1 and second read data obtained by reading the second test pattern P2. The read data corresponds to an example of a detection result. The first read data corresponds to an example of detection data of a first pattern. The second read data corresponds to an example of detection data of a second pattern. The control unit 30 receives the read data.

After reading the test pattern image at step S103, the printing apparatus 10 generates correction data at step S105. The data processing unit 35 of the control unit 30 acquires the read data. As an example, the data processing unit 35 acquires read data obtained by reading the test pattern image illustrated in FIG. 7. The data processing unit 35 extracts first read data from the read data. The data processing unit 35 evaluates the linearity of the first test pattern P1 on the basis of the first read data. The data processing unit 35 determines whether the first pattern displacement image **PG1*d* is included in the first test pattern P1. The test pattern image illustrated in FIG. 7 includes the first pattern displacement image PG1*d*, and therefore the data processing unit 35 determines that the first pattern displacement image PG1*d* is included. When the data processing unit 35 determines that the first pattern displacement image PG1*d* is included, the data processing unit 35 calculates the displacement amount of the first pattern displacement image PG1*d*. The displacement amount of the first pattern displacement image PG1*d* is a shift amount with respect to the first pattern image PG1 different from the first pattern displacement image PG1*d*. The displacement amount of the first pattern displacement image PG1*d* is the first distance d1 illustrated in FIG. 7. The data processing unit 35 calculates the first distance d1** as correction data. The correction data corresponds to an example of a correction value.

After calculating the correction data at step S105, the printing apparatus 10 corrects the second read data at step S107. In the test pattern image illustrated in FIG. 7, the first pattern displacement image **PG1*d* is printed at the same timing, or at the same position in the movement direction MD, as the third pattern image PG3, the sixth pattern image PG6, and the ninth pattern image PG9. The third pattern image PG3 is displaced by the third distance d3 with respect to the virtual third pattern image VPG3. The sixth pattern image PG6 is displaced by the sixth distance d6 with respect to the virtual sixth pattern image VPG6. The ninth pattern image PG9 is displaced by the ninth distance d9 with respect to the virtual ninth pattern image VPG9. The data processing unit 35 corrects the third distance d3, the sixth distance d6, and the ninth distance d9 by the first distance d1. As an example, the data processing unit 35 calculates the difference between the first distance d1 and the third distance d3, the difference between the first distance d1 and the sixth distance d6, and the difference between the first distance d1 and the ninth distance d9. The data processing unit 35 may perform the correction by using a computational expression stored in advance in the storage unit 37. The result obtained by correcting the third distance d3 by the first distance d1 is hereinafter referred to as third displacement amount. The result obtained by correcting the sixth distance d6 by the first distance d1 is hereinafter referred to as sixth displacement amount. The result obtained by correcting the ninth distance d9 by the first distance d1** is hereinafter referred to as ninth displacement amount.

After correcting the second read data at step S107, the printing apparatus 10 specifies the defective nozzle at step S109. The data processing unit 35 reads a threshold value stored in the storage unit 37. The threshold value is an index indicating whether the jetting curve and/or the waviness of the carriage support shaft 19 is within the acceptable range. The data processing unit 35 compares the threshold value, with each of the third displacement amount, the sixth displacement amount, and the ninth displacement amount. For example, when the third displacement amount is greater than the threshold value, the data processing unit 35 determines that the third ink nozzle 2003 is a defective nozzle. When the sixth displacement amount and the ninth displacement amount are smaller than the threshold value, the data processing unit 35 determines that the sixth ink nozzle 2006 and the ninth ink nozzle 2009 are not the defective nozzle. By comparing the threshold value and the displacement amount, the data processing unit 35 specifies the defective nozzle.

The printing apparatus 10 includes the reading sensor 15 that reads the first test pattern P1 and the second test pattern P2 printed on the printing medium M, and the data processing unit 35 that executes a computation on the basis of the read data of the reading sensor 15. The data processing unit 35 calculates the correction data on the basis of the first read data included in the read data, and specifies the defective nozzle on the basis of the second read data included in the correction data and the read data.

By correcting the print blur due to vibration and the waviness of the carriage support shaft 19, the printing apparatus 10 can specify the defective nozzle with less errors.

Figure 11:
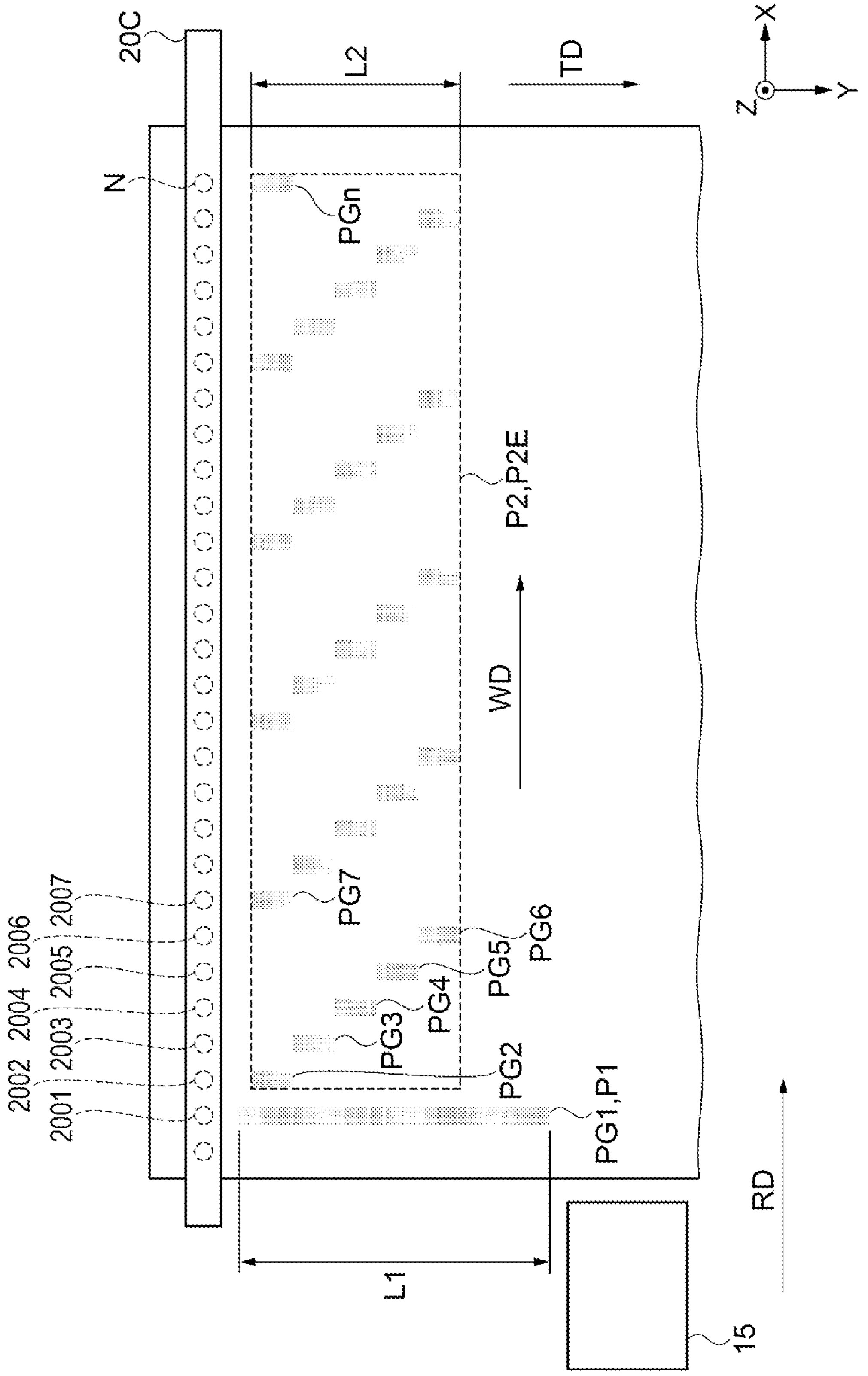
FIG. 11 is a diagram schematically illustrating a test pattern image printed by using a line head.

FIG. 11 schematically illustrates a test pattern image printed by using a line head for the printing mechanism 16. The test pattern image is printed on the printing medium M under the control of the printing control unit 31. The test pattern image is printed by the printing mechanism 16, and thus formed on the printing medium M. The test pattern image illustrated in FIG. 11 is printed by the ink nozzle 20 included in the cyan ink nozzle row 20C. When the test pattern image is printed by the nozzle row other than the cyan ink nozzle row 20C, the mode of the test pattern image is the same as the mode of the test pattern image printed by the cyan ink nozzle row 20C. In FIG. 11, the test pattern image printed by the nozzle row other than the cyan ink nozzle row 20C is omitted.

FIG. 11 illustrates the cyan ink nozzle row 20C including the ink nozzle 20. The cyan ink nozzle row 20C illustrated in FIG. 11 includes n ink nozzles 20. The n is an integer of 8 or greater. It suffices that three or more ink nozzles 20 are included in the cyan ink nozzle row 20C. The number of ink nozzles 20 may be appropriately changed.

The ink nozzles 20 included in the cyan ink nozzle row 20C illustrated in FIG. 11 is the first ink nozzle 2001 to the nth ink nozzle N. Each of the first ink nozzle 2001 to the nth ink nozzle N prints the pattern image included in the test pattern image on the printing medium M.

The first ink nozzle 2001 prints a first pattern image PG1. The second ink nozzle 2002 prints a second pattern image PG2. The third ink nozzle 2003 prints a third pattern image PG3. The fourth ink nozzle 2004 prints a fourth pattern image PG4. The fifth ink nozzle 2005 prints a fifth pattern image PG5. The sixth ink nozzle 2006 prints a sixth pattern image PG6. The seventh ink nozzle 2007 prints a seventh pattern image PG7. The nth ink nozzle N prints the nth pattern image PGn.

FIG. 11 illustrates the ink nozzles 20 at positions corresponding to pattern images. Each pattern image illustrated in FIG. 11 is printed when the printing medium M is moved in the conveyance direction TD with respect to the cyan ink nozzle row 20C. In FIG. 11, the conveyance direction TD corresponds to the +Y direction. In the configuration illustrated in FIG. 11, the conveyance direction TD corresponds to an example of a first direction.

The first ink nozzle 2001 prints the first pattern image PG1 with the first test pattern length L1 in the conveyance direction TD. The first pattern image PG1 is a first test pattern P1. The first test pattern P1 corresponds to an example of a first pattern. The first test pattern length L1 corresponds to an example of a first length. In FIG. 11, among the ink nozzles 20 included in the cyan ink nozzle row 20C, the first ink nozzle 2001 prints the first test pattern P1. The first ink nozzle 2001 corresponds to an example of a first nozzle. The second ink nozzle 2002 to the nth ink nozzle N print the second pattern image PG2 to the nth pattern image PGn. The pattern image lengths of the second pattern image PG2 to the nth pattern image PGn are shorter than the first test pattern length L1. The image group including the pattern images of the second pattern image PG2 to the nth pattern image PGn is the second test pattern P2. The second test pattern P2 corresponds to an example of a second pattern. The second test pattern P2 is composed of a plurality of pattern images within the range surrounded by the dotted line illustrated in FIG. 11. The region surrounded by the dotted line illustrated in FIG. 11 is the second test pattern region P2E. The second test pattern region P2E corresponds to an example of a region on a medium where a second pattern is formed.

The second test pattern P2 includes the pattern images of the second pattern image PG2 to the nth pattern image PGn. The third pattern image PG3 is printed with a displacement with respect to the second pattern image PG2 in the conveyance direction TD and a width direction WD that intersects the conveyance direction TD. The width direction WD is a direction corresponding to the width of the printing medium M. The width direction WD illustrated in FIG. 11 corresponds to the +X direction. The width direction WD corresponds to an example of a second direction. The fourth pattern image PG4 is printed with a displacement with respect to the second pattern image PG2 and the third pattern image PG3 in the conveyance direction TD and the width direction WD. The printing positions of the second pattern image PG2 to the sixth pattern image PG6 are an image arrangement of a step form with a displacement in the conveyance direction TD and the width direction WD. The arrangement of a step form with a displacement in the conveyance direction TD and the width direction WD corresponds to an example of an image arrangement of a step form with a displacement in the first direction and the second direction. The seventh pattern image PG7 is printed with a displacement with respect to the second pattern image PG2 in the width direction WD.

The second test pattern region P2E is a region with the second test pattern width L2 in the conveyance direction TD and the second test pattern length along the width direction WD. The second test pattern width L2 corresponds to an example of a second length. The second test pattern width L2 is the distance between both ends of the second pattern image PG2 to the nth pattern image PGn in the conveyance direction TD. In the second test pattern P2 illustrated in FIG. 11, the second test pattern width L2 is the distance between the −Y direction end portion of the second pattern image PG2 and the +Y direction end portion of the sixth pattern image PG6. The second test pattern length is the distance between the −X direction end portion of the second pattern image PG2 and the +X direction end portion of the nth pattern image PGn.

The second test pattern P2 is printed by the ink nozzles 20 of the second ink nozzle 2002 to the nth ink nozzle N. The ink nozzles 20 of the second ink nozzle 2002 to the nth ink nozzle N correspond to an example of two or more nozzles different from the first nozzle. It suffices that the number of ink nozzles 20 for printing the second test pattern P2 is two or more. The number of ink nozzles 20 for printing the second test pattern P2 may be appropriately changed.

As illustrated in FIG. 11, the first test pattern length L1 is greater than the second test pattern width L2. The printing apparatus 10 can accurately determine the defective nozzle by printing the test pattern image including the first test pattern P1 and the second test pattern P2.

FIG. 11 illustrates the reading sensor 15 that reads the test pattern image. The reading sensor 15 illustrated in FIG. 11 moves in a read direction RD illustrated in FIG. 11. When moving in the read direction RD, the reading sensor 15 reads the test pattern image. The read direction RD is a direction that intersects the conveyance direction TD. The read direction RD illustrated in FIG. 11 coincides with the width direction WD. The read direction RD corresponds to an example of a third direction. The reading sensor 15 reads the pattern images arranged in the width direction WD, the first pattern image PG1, the second pattern image PG2, and the third pattern image PG3 in this order.

As illustrated in FIG. 11, the test pattern image can be applied to the printing apparatus 10 using a line head for the printing mechanism 16.

What is claimed is:

1. A recording apparatus comprising:

a liquid ejection unit configured to move in a first direction relative to a medium and eject liquid; and a control unit configured to control the liquid ejection unit, wherein the liquid ejection unit includes a plurality of nozzles arranged in a nozzle arrangement direction and configured to eject the liquid, the plurality of nozzles including a first nozzle and two or more second nozzles that are different from the first nozzle, the control unit forms, by using the first nozzle, a first pattern including at least one image segment, the at least one image segment being formed by the first nozzle, the first pattern having a first length in the first direction, the control unit forms, by using the two or more second nozzles, a second pattern including two or more image segments, the two or more image segments being formed by the two or more second nozzles, respectively, the two or more image segments being arranged so as to be displaced in a step-like manner in the first direction and a second direction different from the first direction, a region, on the medium, where the second pattern is formed has a second length in the first direction, the first length is greater than the second length, the region, on the medium, where the second pattern is formed overlaps with the first pattern as viewed in the second direction, the region, on the medium, where the second pattern is formed does not overlap with the first pattern as viewed in the first direction, and the nozzle arrangement direction is a direction different from both the first direction and the second direction, or a direction different from the first direction and parallel to the second direction.

2. The recording apparatus according to claim 1, wherein the liquid ejection unit includes an ejection unit driving mechanism configured to perform scanning of the plurality of nozzles in the first direction, and the control unit forms the first pattern and the second pattern when the ejection unit driving mechanism performs first scanning.

3. The recording apparatus according to claim 1, wherein the liquid ejection unit includes an ejection unit driving mechanism configured to perform scanning of the plurality of nozzles in the first direction, the control unit forms the first pattern when the ejection unit driving mechanism performs first scanning, and the control unit forms the second pattern when the ejection unit driving mechanism performs scanning different from the first scanning.

4. The recording apparatus according to claim 1, wherein the first nozzle is an inspection nozzle whose condition is acquired in advance.

5. The recording apparatus according to claim 1, comprising:

a detection unit configured to detect the first pattern and the second pattern, formed on the medium; and a computation unit configured to execute a computation based on a result of the detection by the detection unit, wherein the computation unit calculates a correction value based on detection data, included in the result of the detection, of the first pattern, and specifies a defective nozzle based on detection data, included in the result of the detection, of the second pattern and the correction value.

6. The recording apparatus according to claim 5, wherein the medium moves in a third direction relative to the detection unit, the control unit forms, by using a third nozzle different from the first nozzle, the first pattern different from the first pattern formed by using the first nozzle, the control unit forms the second pattern by using the two or more second nozzles different from the first nozzle and the third nozzle, and the first nozzle is located at one end in the third direction of the plurality of nozzles, and the third nozzle is located at another end in the third direction of the plurality of nozzles.

7. The recording apparatus according to claim 5, wherein the medium moves relative to the detection unit, and the control unit forms the first pattern and the second pattern in an arrangement such that the first pattern is detected by the detection unit before the second pattern is detected.

8. A recording method comprising:

moving a medium in a first direction relative to a liquid ejection unit including a plurality of nozzles arranged in a nozzle arrangement direction, the plurality of nozzles including a first nozzle and two or more second nozzles that are different from the first nozzle;

forming, by using the first nozzle, a first pattern including at least one image segment, the at least one image segment being formed by the first nozzle, the first pattern having a first length in the first direction; and forming, by using the two or more second nozzles, a second pattern including two or more image segments, the two or more image segments being formed by the two or more second nozzles, respectively, the two or more image segments being arranged so as to be displaced in a step-like manner in the first direction and a second direction intersecting the first direction, wherein a region, on the medium, where the second pattern is formed has a second length in the first direction, the first length is greater than the second length, the region, on the medium, where the second pattern is formed overlaps with the first pattern as viewed in the second direction, the region, on the medium, where the second pattern is formed does not overlap with the first pattern as viewed in the first direction, and the nozzle arrangement direction is a direction different from both the first direction and the second direction, or a direction different from the first direction and parallel to the second direction.

* * * * *